(12) United States Patent
Yun et al.

(10) Patent No.: US 10,852,153 B2
(45) Date of Patent: Dec. 1, 2020

(54) AUTONOMOUS VEHICLE AND METHOD OF CONTROLLING THE SAME

(71) Applicant: LG Electronics Inc., Seoul (KR)

(72) Inventors: Ho Yun, Seoul (KR); Junghee Park, Seoul (KR); Boyoung Jeong, Seoul (KR); Soonhong Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 15/966,407

(22) Filed: Apr. 30, 2018

(65) Prior Publication Data

US 2018/0328750 A1     Nov. 15, 2018

Related U.S. Application Data

(60) Provisional application No. 62/505,129, filed on May 12, 2017.

(30) Foreign Application Priority Data

Sep. 27, 2017   (KR) ........................ 10-2017-0125311

(51) Int. Cl.
*G01C 21/34*     (2006.01)
*B60W 30/06*     (2006.01)
(Continued)

(52) U.S. Cl.
CPC ......... *G01C 21/3484* (2013.01); *B60W 30/06* (2013.01); *B62D 1/02* (2013.01);
(Continued)

(58) Field of Classification Search
None
See application file for complete search history.

(56) References Cited

U.S. PATENT DOCUMENTS 9,557,741 B1    1/2017   Elie et al.
2005/0171654 A1*   8/2005   Nichols .................. G08G 5/065
                                                     701/15
(Continued)

FOREIGN PATENT DOCUMENTS

DE     102011107974     1/2013
DE     102013015348     4/2014
(Continued)

OTHER PUBLICATIONS

European Search Report in European Application No. 18171786.9, dated Oct. 15, 2018, 12 pages.
(Continued)

*Primary Examiner* — Jonathan M Dager
*Assistant Examiner* — Garrett F Evans
(74) *Attorney, Agent, or Firm* — Fish & Richardson P.C.

(57) ABSTRACT

A method of controlling a vehicle, which is configured to be autonomously driven, includes determining a learned route based on a driving route that the vehicle has driven in a manual mode from a starting location to an ending location, driving the vehicle along the learned route in an autonomous mode, detecting a parking space based on driving the vehicle along the learned route in the autonomous mode, and based on a detection of the parking space in the learned route, parking the vehicle in the detected parking space.

18 Claims, 25 Drawing Sheets

(51) Int. Cl.
  *B62D 15/02* (2006.01)
  *G08G 1/16* (2006.01)
  *B62D 1/02* (2006.01)
  *G08G 1/14* (2006.01)
  *G05D 1/00* (2006.01)
  *G06K 9/00* (2006.01)

(52) U.S. Cl.
  CPC ..... *B62D 15/0285* (2013.01); *G01C 21/3415* (2013.01); *G05D 1/0088* (2013.01); *G06K 9/00812* (2013.01); *G08G 1/143* (2013.01); *G08G 1/168* (2013.01); *G05D 2201/0213* (2013.01)

(56) References Cited

U.S. PATENT DOCUMENTS

2017/0135621 A1* 5/2017 Lee .................. A61B 5/163
2018/0357906 A1* 12/2018 Yaldo ............... B62D 15/0285
2019/0009794 A1* 1/2019 Toyoda ............. B60W 50/10

FOREIGN PATENT DOCUMENTS

| DE | 102014216577 | 2/2016 |
| DE | 102015212581 | 1/2017 |
| DE | 102016211180 | 3/2017 |
| JP | H06324736 | 11/1994 |
| JP | 2016033500 | 3/2016 |
| KR | 1020160066115 | 6/2016 |
| KR | 101637842 | 7/2016 |

OTHER PUBLICATIONS

PCT International Search Report and Written Opinion in International Appln. No. PCT/KR2018/011403, dated Jan. 7, 2019, 12 pages.

Hyundai Kia, "From parking to departure, magical autonomous parking technology first released", dated Aug. 25, 2016, 6 pages.

* cited by examiner

FIG. 20

2000
Exclusion List
Home : Basement 1 (3/1 ~ 3/3)
Home : Basement 2 (4/1 ~ 4/8)

2010
Parking Profile 1 (April 3)
Home : Basement 1 (O)
Home : Basement 2 (X)
Home : Basement 3 (O)

2020
Parking Profile 2 (April 10)
Home : Basement 1 (O)
Home : Basement 2 (O)
Home : Basement 3 (O)

AUTONOMOUS VEHICLE AND METHOD OF CONTROLLING THE SAME

CROSS-REFERENCE TO RELATED APPLICATIONS

This application claims the benefit of U.S. Provisional Application No. 62/505,129, filed on May 12, 2017, and Korean Patent Application No. 10-2017-0125311, filed on Sep. 27, 2017, which are hereby incorporated by reference as if fully set forth herein.

FIELD

The present disclosure relates to an autonomous vehicle and a method of controlling the same.

BACKGROUND

A vehicle is an apparatus that can transport a user in a desired direction. For example, the vehicle may include an automobile.

Vehicles may be equipped with sensors and electronic devices to provide user convenience. For example, research has been actively conducted on advanced driver assistance systems (ADAS) to provide user convenience for various operations in driving. Further, autonomous vehicles are under active development.

Recently, techniques are under development for enabling an autonomous vehicle to learn a parking slot and to park in the learned parking slot for itself.

In some cases where an obstacle is present at the learned parking slot, the autonomous vehicle may be unable to perform autonomous parking. In some cases, the autonomous vehicle may be unable to actively learn a plurality of parking slots.

SUMMARY

One aspect of the present disclosure is to provide an autonomous vehicle configured to determine and store a property of an object detected in a driving route during learning the driving route from a starting location to an ending location.

Another aspect of the present disclosure is to provide an autonomous vehicle for starting to drive in a learned route, detecting an empty parking slot in the route, and parking in the detected parking slot.

Additional advantages, objects, and features of the disclosure will be set forth in part in the following description and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to one aspect of the subject matter described in this application, a method of controlling a vehicle that is configured to be autonomously driven includes determining a learned route based on a driving route that the vehicle has driven in a manual mode from a starting location to an ending location, driving the vehicle along the learned route in an autonomous mode, detecting a parking space based on driving the vehicle along the learned route in the autonomous mode, and based on a detection of the parking space in the learned route, parking the vehicle in the detected parking space.

Implementations according this aspect may include one or more of the following features. For example, determining the learned route based on the driving route may include detecting an object located in the driving route from the starting location to the ending location, determining a property of the object detected in the driving route, and storing information about the property of the object. In some examples, storing the information about the property of the object comprises storing first information related to an object that is located at a static location in the driving route or second information related to an object that is movable in the driving route. Determining the learned route may further include, based on the property of the object, determining a second route between a first location and a second location in the driving route, the second route being different from the driving route in which the vehicle has driven from the first location to the second location, and storing the second route as the learned route.

In some implementations, determining the learned route may further include determining a partial route including at least one of the starting location or the ending location, and based on the partial route, generating the learned route from the starting location to the ending location. In some implementations, determining the learned route may further include detecting at least one branch point in the driving route in which the vehicle has driven, and storing a route that extends from the at least one branch point as the learned route. Driving the vehicle along the learned route in the autonomous mode may include determining, by an object detection device, that the vehicle has arrived at a location within a distance from the starting location, receiving, through a user interface device, a user input for starting to drive along the learned route, and based on the user input, driving the vehicle along the learned route from the location within the distance from the starting location.

In some implementations, the method may further include receiving information about a parking facility, where driving the vehicle along the learned route in the autonomous mode may include based on the information about the parking facility, modifying the learned route, and driving the vehicle along the modified learned route in the autonomous mode. In some examples, driving the vehicle along the learned route in the autonomous mode may include receiving a user input for returning the vehicle to one of the starting location or the ending location, and in response to the user input, controlling the vehicle to return to the one of the starting location or the ending location along the learned route. In some examples, controlling the vehicle to the one of the starting location or the ending location along the learned route may further include determining a current location of the vehicle in the learned route, and based on the determined current location of the vehicle, determining whether to maintain a driving direction of the vehicle.

In some implementations, detecting the parking space may include receiving, from an object detection unit, a detection result including detection of the object, and based on the received detection result and the stored information about the property of the object, detecting the parking space. Parking the vehicle in the detected parking space may include, based on a detection of a plurality of parking spaces, selecting a parking space according to a predetermined prioritization. The parking space may include a reserved parking space that is located at the ending location. In some examples, parking the vehicle in the detected parking space may include detecting an object in the reserved parking space, the object not being included in the learned route, based on an area occupied by the object in the reserved parking space, determining an available area for parking of the vehicle, and parking the vehicle in the available area.

In some implementations, the method may further include, based on parking the vehicle in the detected parking space, storing information about a location of the detected parking space in a memory, in response to a user input, obtaining the information about the location of the parking space and information about the learned route from the memory, and controlling the vehicle to move out from the parking space to the ending location along at least a part of the learned route. In some examples, the method may further include detecting, by an object detection device, an object located outside of the vehicle, and generating a connection route to the learned route based on the detected object.

In some implementations, controlling the vehicle to move out from the parking space may include determine a current location of the vehicle, determining whether the current location of the vehicle has changed since the vehicle parked, based on a determination that the current location of the vehicle has changed since the vehicle parked, determine whether the current location of the vehicle is in the learned route, based on a determination that the current location of the vehicle is in the learned route, controlling the vehicle to move out from the parking space along the learned route, and based on a determination that the current location of the vehicle is outside of the learned route, generating a connection route to the learned route and controlling the vehicle to move out from the parking space along the connection route to the learned route.

In some implementations, the method may further include identifying a user of the vehicle, determining a location of the user, based on the location of the user, determining whether the user is located in the learned route, and based on a determination that the user is located in the learned route, controlling the vehicle to stop at the location of the identified user. In some examples, the method may further include based on a determination that the identified user is located outside of the learned route, generating a connection route to the location of the user, and driving the vehicle to the location of the user along the connection route.

According to another aspect of the subject matter, a vehicle includes a wheel, a power source configured to drive the wheel, and at least one processor. The at least one processor is configured to determine a learned route based on a driving route that the vehicle has driven in a manual mode from a starting location to an ending location, drive the vehicle along the learned route in an autonomous mode, detect a parking space based on the vehicle being driven along the learned route in the autonomous mode, and based on a detection of the parking space in the learned route, park the vehicle in the detected parking space.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate implementation(s) of the disclosure and together with the description serve to explain the principle of the disclosure.

FIG. 20 is a view illustrating an example change of a driving route based on input by a user.

DETAILED DESCRIPTION

A vehicle described in this specification may include, but is not limited to, an automobile and a motorcycle. Hereinafter, a description will be given based on an automobile.

A vehicle described in this specification may include, but is not limited to, various types of internal combustion engine vehicles including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1:
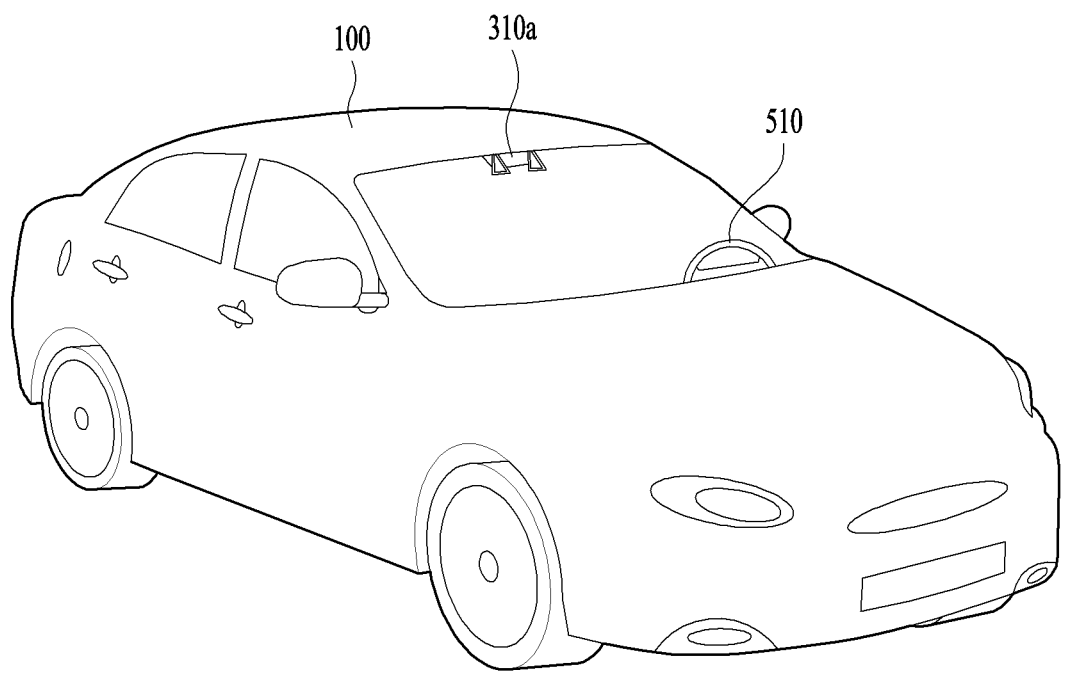
FIG. 1 is a view illustrating an example external appearance of an example vehicle.
Figure 1:
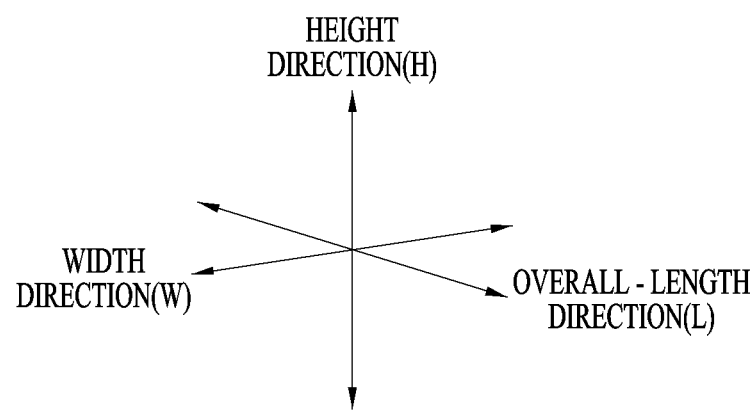
Figure 2:
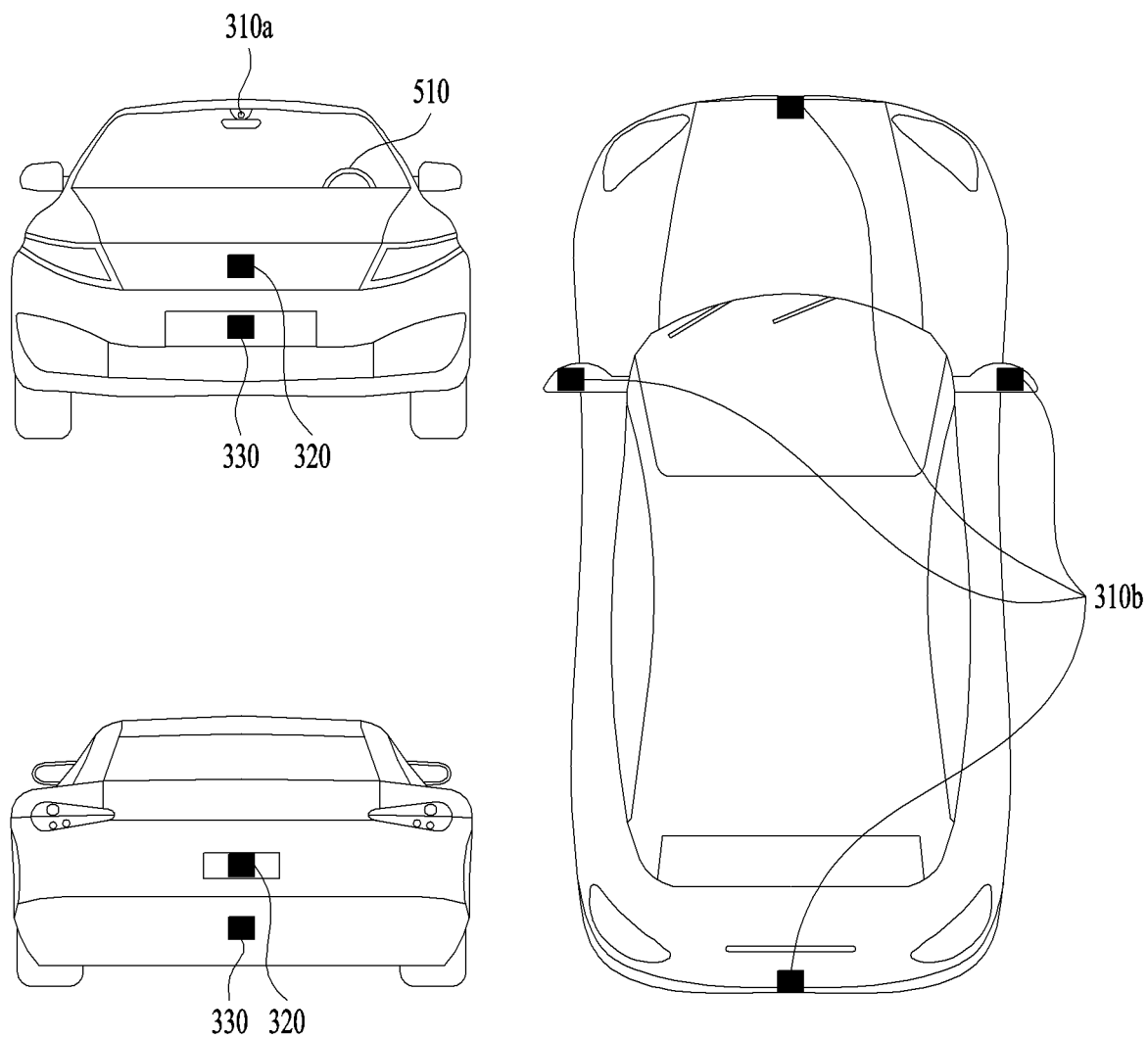
FIG. 2 illustrates different angled views of example external appearances of an example vehicle.
Figure 3:
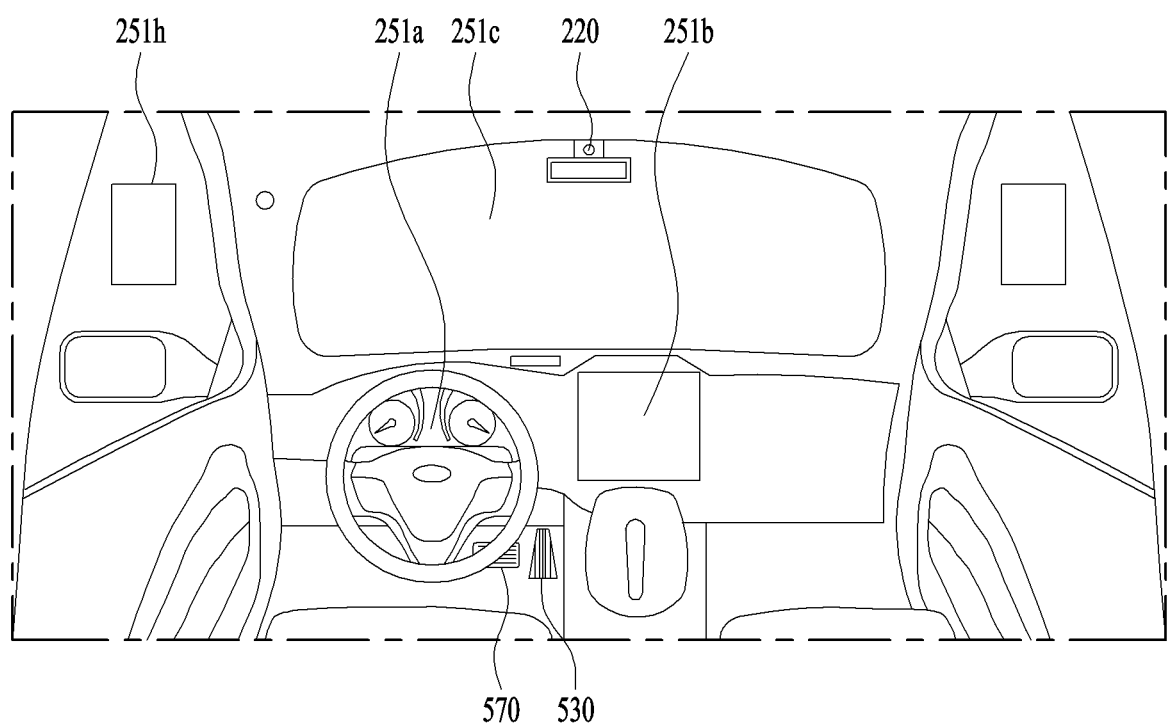
FIGS. 3 and 4 are views illustrating example interior configurations of an example vehicle.
Figure 4:
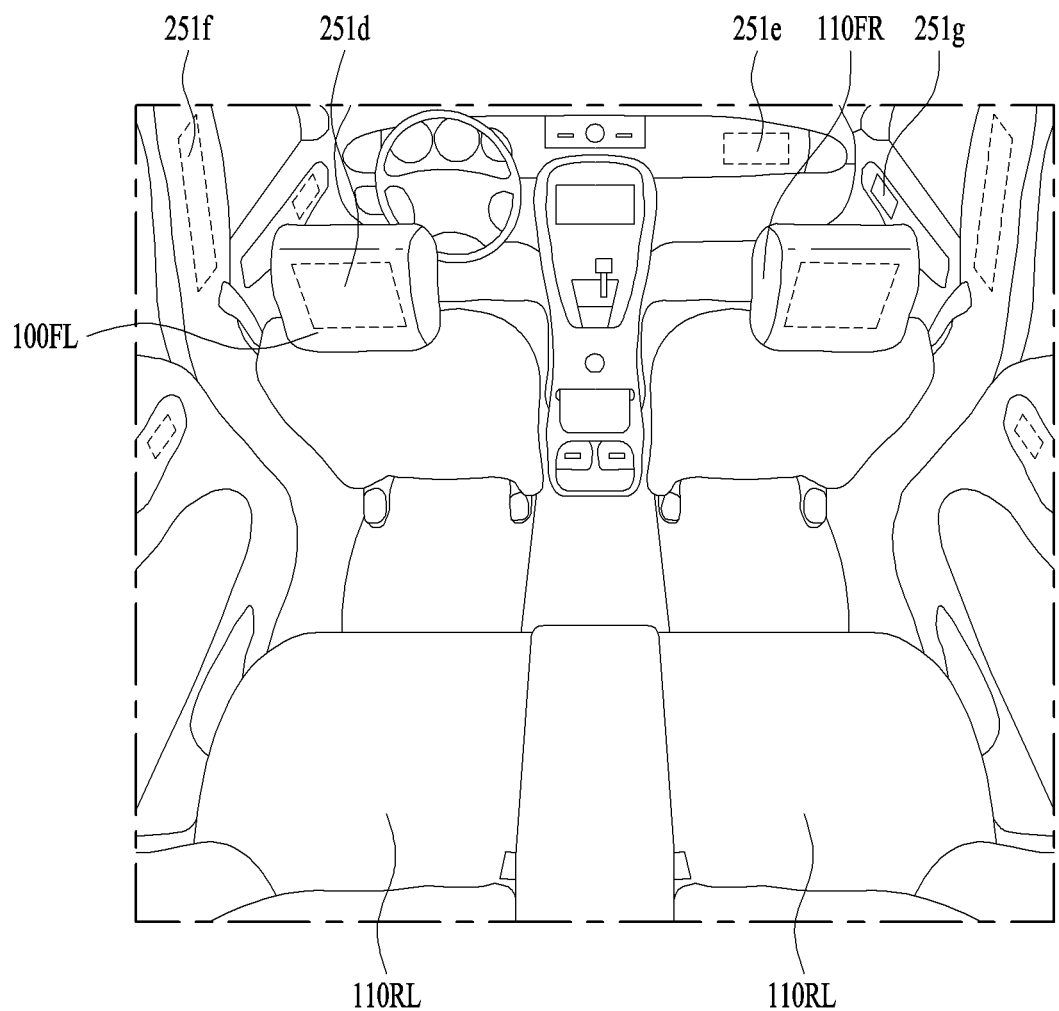
Figure 5:
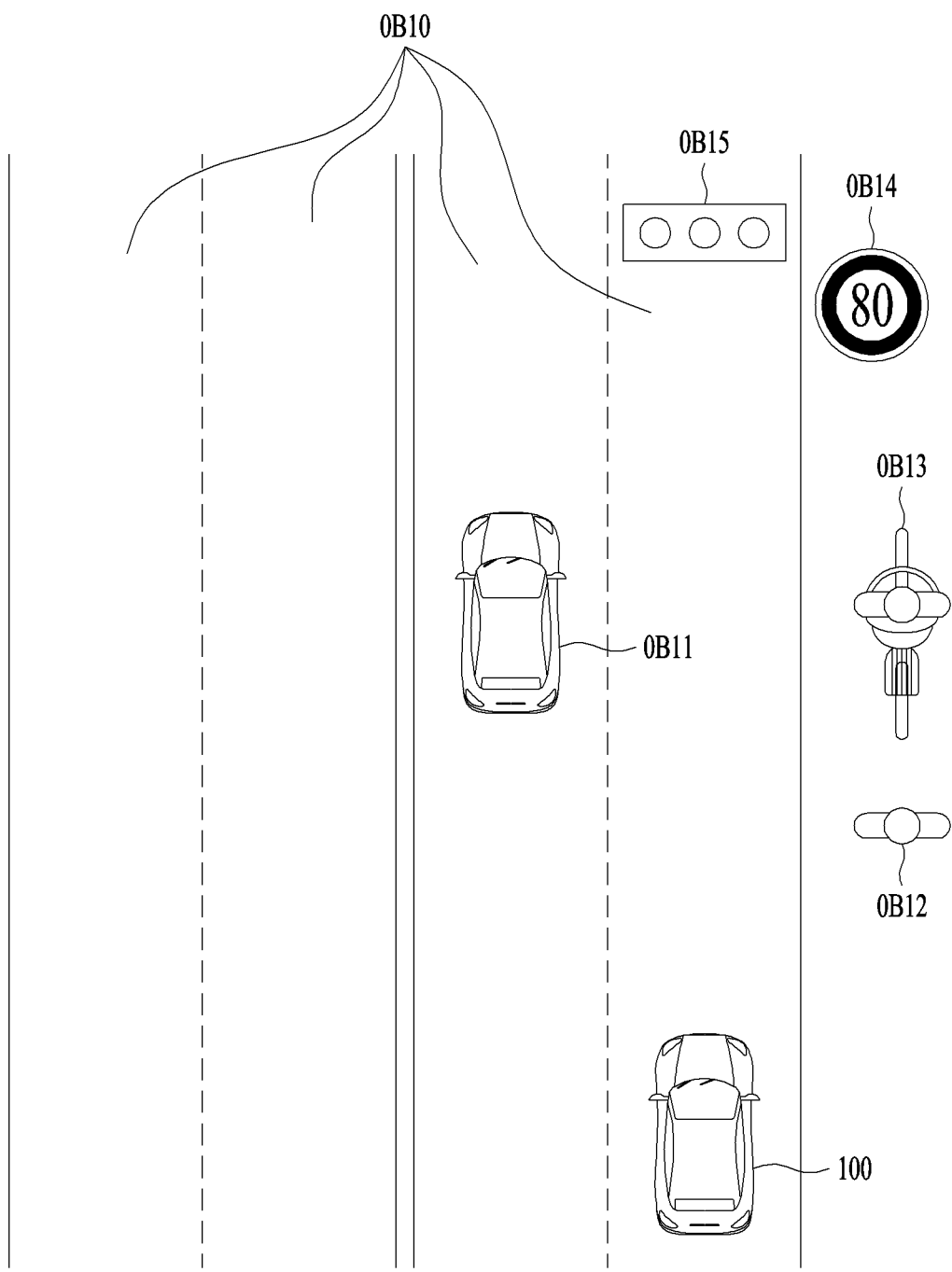
FIGS. 5 and 6 are views illustrating example objects around an example vehicle.
Figure 6:
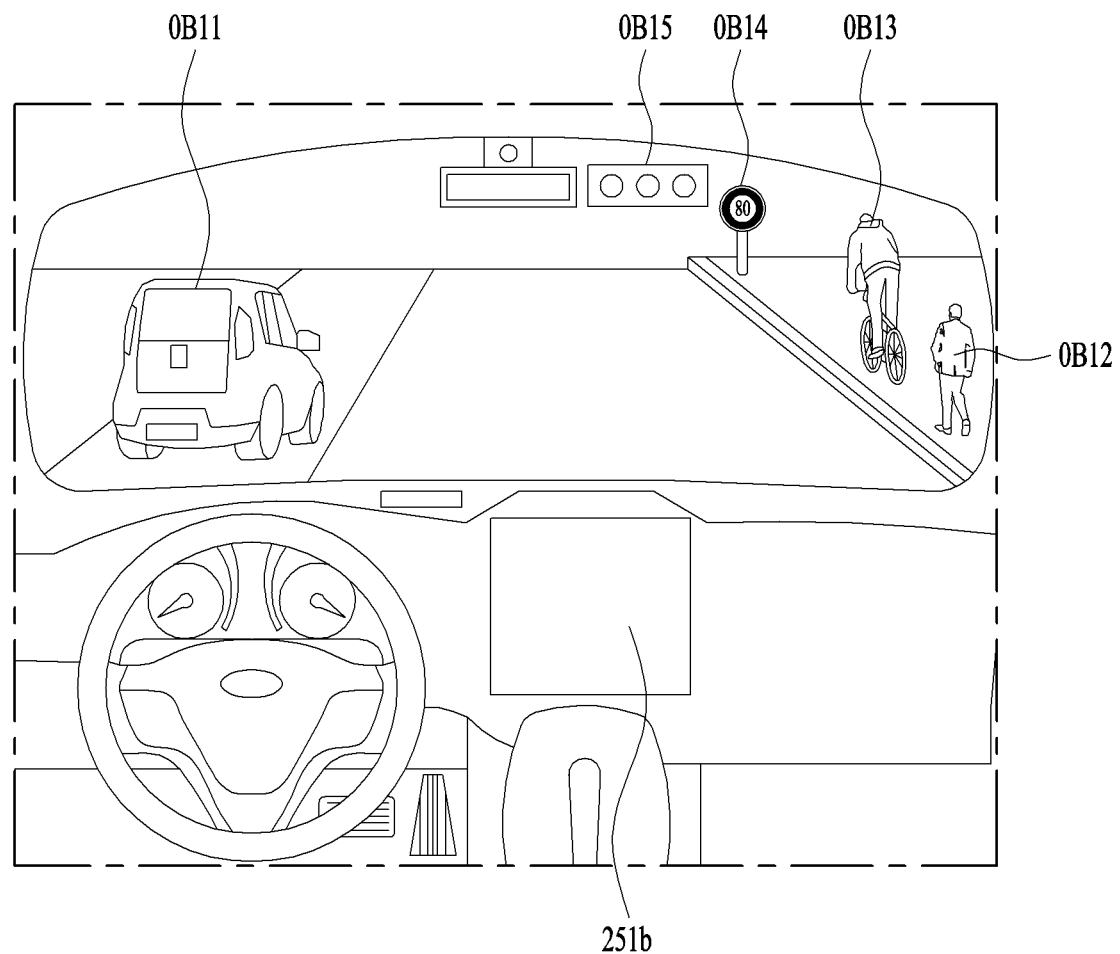
Figure 7:
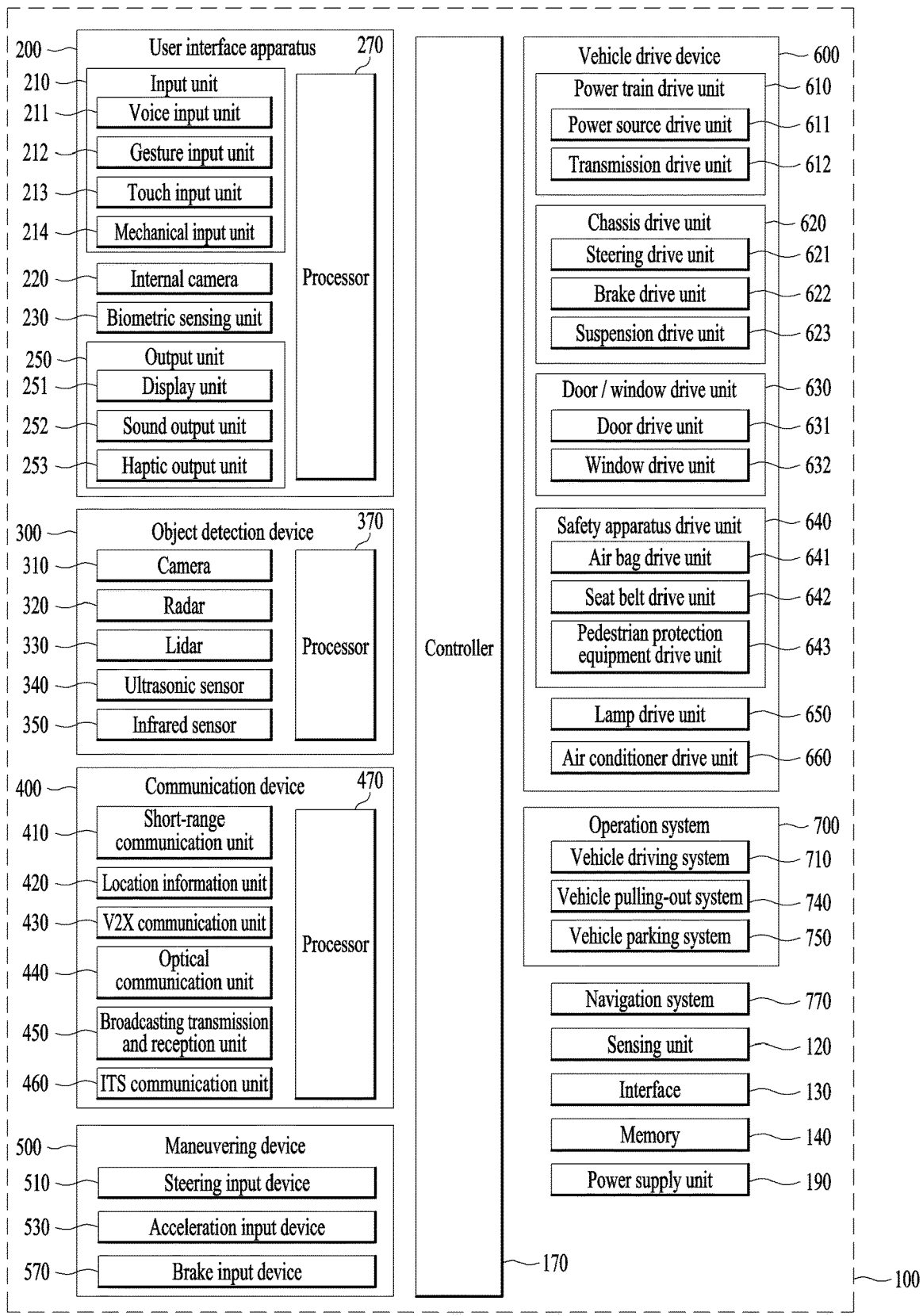
FIG. 7 is a block diagram illustrating example components of an example vehicle.

FIG. 1 is a view of the external appearance of a vehicle according to an implementation of the present disclosure, FIG. 2 is different angled views of a vehicle according to an implementation of the present disclosure, FIGS. 3 and 4 are views of the internal configuration of a vehicle according to an implementation of the present disclosure, FIGS. 5 and 6 are views for explanation of objects according to an implementation of the present disclosure, and FIG. 7 is a block diagram illustrating a vehicle according to an implementation of the present disclosure.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous mode or a manual mode in response to a user input.

For example, in response to a user input received through a user interface device 200, the vehicle 100 may be switched from a manual mode to an autonomous mode, or vice versa.

The vehicle 100 may be switched to the autonomous mode or to the manual mode based on driving environment information.

The driving environment information may include at least one of the following: information on an object outside a vehicle, navigation information, and vehicle state information.

For example, the vehicle 100 may be switched from the manual mode to the autonomous mode, or vice versa, based on driving environment information generated by the object detection device 300.

In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700.

For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" is the length from the front end to the rear end of the vehicle 100, the term "overall width" is the width of the vehicle 100, and the term "overall height" is the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some implementations, the vehicle 100 may further include other components in addition to the aforementioned components, or may not include some of the aforementioned components.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Further, each of the sensing unit 120, the interface unit 130, the memory 140, the power supply unit 190, the user interface device 200, the object detection device 300, the communication device 400, the maneuvering device 500, the vehicle drive device 600, the operation system 700, and the navigation system 770 may have an individual processor or may be incorporated in the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some implementations, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a time of flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a head up display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface device 200 may include a plurality of display units 251a to 251g.

The display unit 251 may be disposed in a region of a steering wheel, a region 251a, 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200.

In some implementations, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100.

In some implementations, the user interface device 200 may be referred to as a display device for a vehicle.

The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

In some implementations, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a LIDAR 330, an ultrasonic sensor 340, an infrared sensor 350, and a processor 370. Each component of the object detection device may be separated from or integrated with the sensing unit, structurally or operatively.

In some implementations, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an around view monitoring (AVM) camera 310b, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The LIDAR 330 may include a laser transmission unit and a laser reception unit. The LIDAR 330 may be implemented by the TOF scheme or the phase-shift scheme.

The LIDAR 330 may be implemented as a drive type LIDAR or a non-drive type LIDAR.

When implemented as the drive type LIDAR, the LIDAR 330 may rotate by a motor and detect an object in the vicinity of the vehicle 100.

When implemented as the non-drive type LIDAR, the LIDAR 330 may utilize a light steering technique to detect an object located within a predetermined distance from the vehicle 100.

The LIDAR 330 may detect an object through the medium of laser light by employing the TOF scheme or the phase-shift scheme, and may detect a location of the detected object, the distance to the detected object, and the speed relative to the detected object.

The LIDAR 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect or classify an object by comparing data sensed by the camera 310, the radar 320, the LIDAR 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the LIDAR 330, the ultrasonic sensor 340, and the infrared sensor 350 in the memory 140.

Each step of the learning mode based on analysis of stored data, and an operating mode following the learning mode will be described later in detail in relation to the operation system 700. According to an implementation, the object detection device 300 may include a plurality of processors 370 or no processor 370. For example, the camera 310, the radar 320, the LIDAR 330, the ultrasonic sensor 340, and the infrared sensor 350 may include individual processors.

In a case where the object detection device 300 does not include the processor 370, the object detection device 300 may operate under control of the controller 170 or a processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some implementations, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400.

In some implementations, the communication device 400 may include a plurality of processors 470, or may not include the processor 470.

In a case where the communication device 400 does not include the processor 470, the communication device 400 may operate under control of the controller 170 or a processor of a device inside of the vehicle 100.

In some implementations, the communication device 400 may implement a vehicle display device, together with the user interface device 200. In this case, the vehicle display device may be referred to as a telematics device or an audio video navigation (AVN) device.

The communication device 400 may operate under control of the controller 170.

The maneuvering device 500 is configured to receive a user input for driving the vehicle 100.

In the manual mode, the vehicle 100 may operate based on a signal provided by the maneuvering device 500.

The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive device 600 may further include other components in addition to the aforementioned components, or may not include some of the aforementioned components.

In some implementations, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power train drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, for example, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle drive device 600 may include its own processor.

The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750.

In some implementations, the operation system 700 may further include other components in addition to the aforementioned components, or may not include some of the aforementioned component.

In some implementations, the operation system 700 may include a processor. Each unit of the operation system 700 may include its own processor.

In some implementations, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the aforedescribed manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the aforedescribed autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

According to an implementation, the processor of the operation system 700 may drive the vehicle 100 along the learned driving route by controlling the driving system 710 in the operating mode.

According to an implementation, the processor of the operation system 700 may pull out the vehicle 100 from the learned parking space by controlling the vehicle pulling-out system 740 in the operating mode.

In some implementations, the processor of the operation system 700 may park the vehicle 100 in the learned parking space by controlling the vehicle parking system 750 in the operating mode. For example, in a case where the operation system 700 is implemented as software, the operation system 700 may be a subordinate concept of the controller 170.

In some implementations, the operation system 700 may be a concept including at least one selected from among the user interface device 200, the object detection device 300, the communication device 400, the vehicle drive device 600, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400.

Conceptually, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170.

The driving system 710 may be referred to as a vehicle driving control device.

The vehicle pulling-out system 740 may perform an operation of pulling the vehicle 100 out of a parking space.

The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space.

The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication device 400.

In some implementations, the navigation system 770 may be classified as an element of the user interface device 200.

Figure 8:
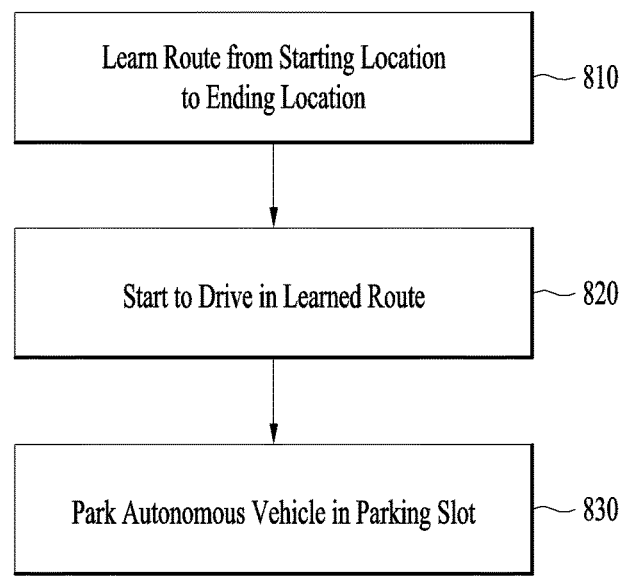
FIG. 8 is a flowchart illustrating an example learning-based vehicle parking method.

FIG. 8 is a flowchart illustrating a method of learning-based vehicle parking method according to an implementation of the present disclosure. Hereinbelow, it may be understood that a processor of the vehicle 100 as described below is a component corresponding to the controller 170 illustrated in FIG. 7.

As in step 810, the processor of the vehicle 100 learns a route in which the vehicle 100 has driven from a starting location to an ending location in the manual mode or the learning mode. Step 810 may correspond to execution of the learning mode in the operation system 700. Various implementations related to step 810 will be described in detail with reference to FIGS. 9 to 15.

Subsequently, the processor of the vehicle 100 starts driving of the vehicle 100 along the learned route in the operating mode as in step 820. In relation to the start of driving and the driving, various implementations of step 820 will be described in detail with reference to FIGS. 16 to 21B.

Finally, upon detection of an empty parking slot in the learned route, the processor of the vehicle 100 parks the vehicle 100 in the detected parking slot as in step 830. Various implementations of step 830 will be described in detail with reference to FIGS. 22, 23A, 23B, and 24A to 24D.

Figure 9:
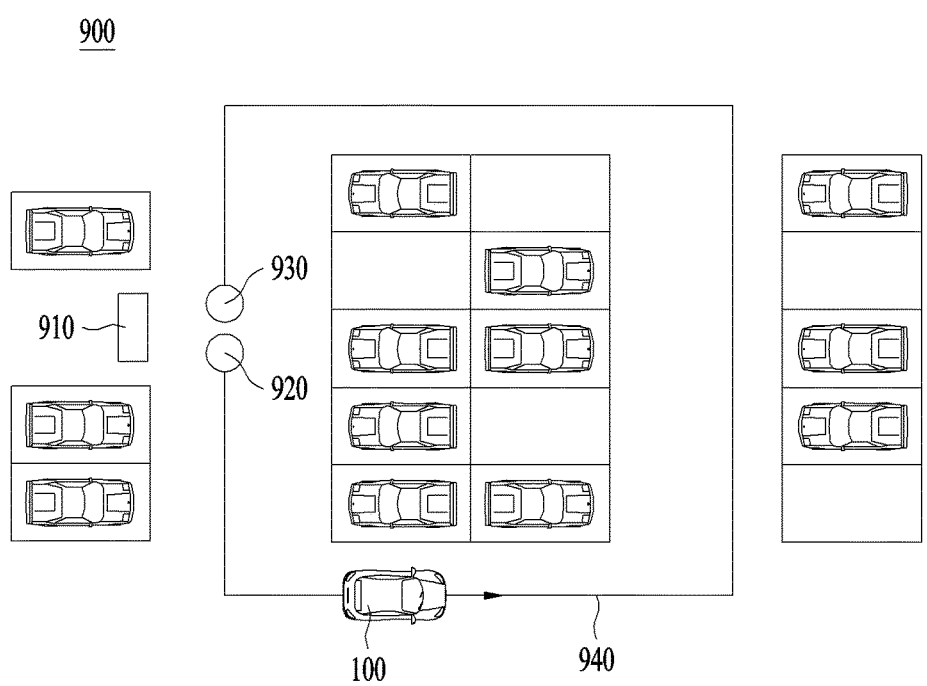
FIG. 9 is a view illustrating an example of route learning in an example manual mode or an example learning mode.

FIG. 9 is a view illustrating route learning of a processor of a vehicle in a manual mode or a learning mode according to an implementation of the present disclosure. In FIG. 9, the vehicle 100 is shown as having entered a parking space 900 such as a public parking lot or a garage through an entrance 910.

The processor of the vehicle 100 initiates the learning mode at a starting location 920 in response to a user input received through the user interface device 200. The learning mode may be performed in the manual mode in which the vehicle 100 is manually maneuvered by a user. That is, while the user is driving the vehicle 100 by manual maneuvering, a route 940 is learned in the learning mode.

Learning the route 940 includes generating map data for the route 940 in which the vehicle 100 drives. Particularly, the processor of the operation system 700 may generate map data based on information detected through the object detection device 300 during driving of the vehicle 100 from the starting location 920 to an ending location 930.

Learning the route 940 may be distinguished conceptually from learning a road in a space in which the vehicle 100 may drive, that is, the parking space 900. Learning the route 940 amounts to learning a driving trace of the vehicle 100 from the starting location 920 to the ending location 930.

On the other hand, learning of the space in which the vehicle 100 may drive amounts to learning a drivable space based on the overall width and length of the vehicle 100, the width of a road, and parking lines drawn on the floor surface of the parking space 900. In concept, learning the space in which the vehicle 100 may drive may be included in the step of determining the property of an object.

Although learning the route 940 includes learning the driving trace of the vehicle 100 in the parking space 900 in a narrow sense, learning the route 940 may be understood as including even the concept of learning an object, a parking slot, and so on detected through the object detection device 300 in the parking space 900 by the vehicle in a broad sense.

The processor of the vehicle 100 may learn information detected through the object detection device 300, that is, information about the properties of objects by classifying the information into fixed information and movable information in the route learning step.

The fixed information refers to information which is not variable over time, such as a pillar in a parking lot, a tree, or the foregoing space in which the vehicle 100 may drive. The fixed information is used when the vehicle 100 autonomously drives in the learned route.

The movable information refers to non-permanent information such as information about the location of any other parked vehicle. The processor of the vehicle 100 may learn a location at which a parking line is not recognized as a parking-available location, based on information about another vehicle parked at the location.

In some implementations, the processor of the vehicle 100 may detect an empty parking slot using information related to the properties of objects stored in the route learning step. For example, the processor of the vehicle 100 may use not only the fixed information such as the area of the parking slot where the parking line is recognized and the space occupied by other parked vehicle, but also the movable information such as other parked vehicle itself.

In some implementations, while learning is in progress in the manual mode, the maximum speed of the vehicle 100 may be limited. That is, if the speed of the vehicle 100 becomes equal to or larger than a predetermined maximum speed, the processor of the vehicle 100 may output an alarm message to the user through the output unit 250, to thereby control cancellation of the learning.

In some implementations, a driving pattern of the user may also be learned in the route learning step. For example, the processor of the vehicle 100 may generate a speed profile of changes in the speed of the vehicle 100 in a driving route and store the speed profile in the memory 140, during learning. Or the processor of the vehicle 100 may store, in the memory 140, information about manipulations of the steering wheel of the vehicle 100 in the driving route through a steering sensor, during learning. A learned driving pattern including the speed profile or the information about manipulations of the steering wheel may be used in later autonomous driving of the vehicle 100 in the autonomous mode.

Like the learning initiation, the learning also ends in response to a user input through the user interface device 200. That is, upon receipt of a user input for ending the learning when the vehicle 100 reaches the ending location 930, the processor of the vehicle 100 stores the route 940 learned from the starting location 920 to the ending location 930.

In some implementations, the initiation or ending of the learning may be performed through the recognition and determination of the situation by the processor of the vehicle 100 as well as the direct input through the physical button or touch display.

For example, the processor of the vehicle 100 may determine a specific location within sensing area as the starting location or the ending location by recognizing a situation that all of the passengers except for the driver are unloaded and that the entrance is located within a predetermined distance from the vehicle 100 and that the vehicle 100 stopped at the parking slot and that the gear of the vehicle 100 is changed to the park (P) state and that the ignition switch is turned off.

In some examples, the ending location 930 of the route 940 may be substantially the same as the starting location 920. In this case, when the processor of the vehicle 100 recognizes that the vehicle 100 arrives at the starting location 920, the processor may end the route learning without user input.

In some implementations, the route 940 learned in the parking space 900 is used for parking and pulling-out of the vehicle 100, which will be described in detail below.

Figure 10A:
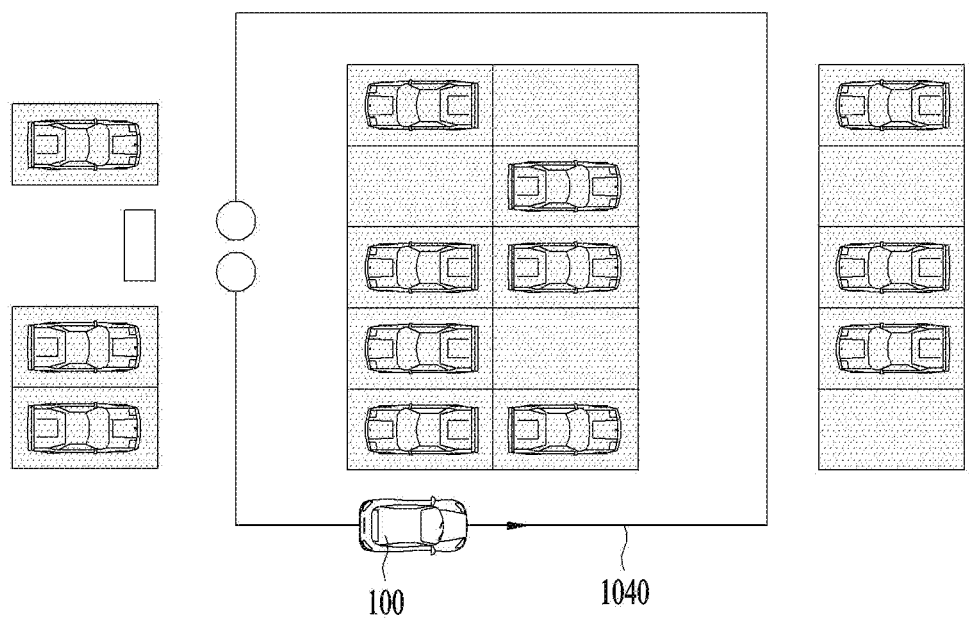
FIGS. 10A and 10B are views illustrating examples of route learning in the manual mode or the learning mode.
Figure 10B:
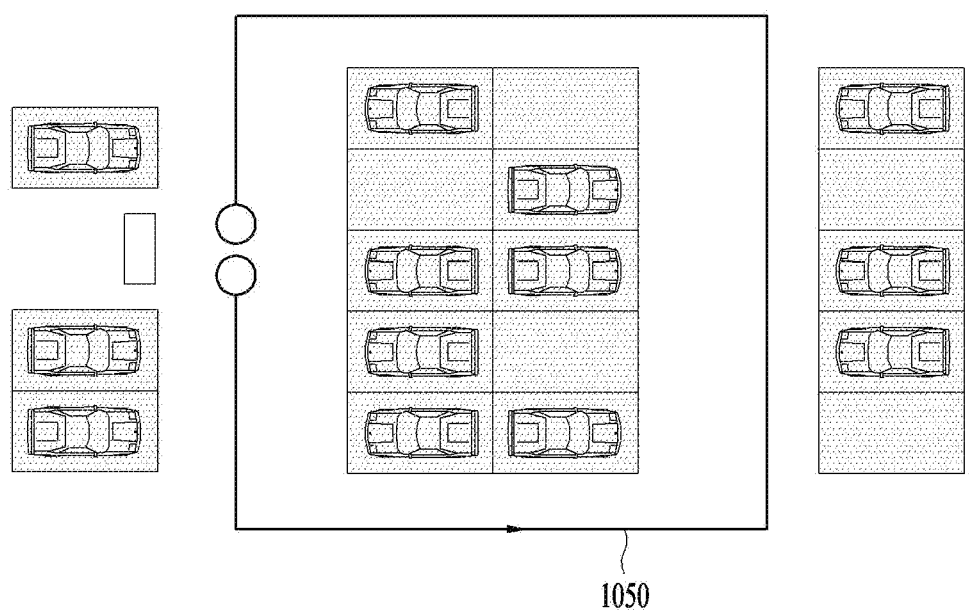

FIGS. 10A and 10B illustrates route learning of the processor of the vehicle 100 in the manual mode or the learning mode according to another implementation of the present disclosure.

In some example, each floor is designed to have the same structure in a multi-story parking facility such as a tower parking system. Accordingly, it may not be necessary to learn a route on every floor.

For example, the processor of the vehicle 100 learns a route 1040 on one floor, as illustrated in FIG. 10A. Subsequently, the processor of the vehicle 100 may store a route 1050 on another floor as the same as the route 1040, as illustrated in FIG. 10B.

Figure 11:
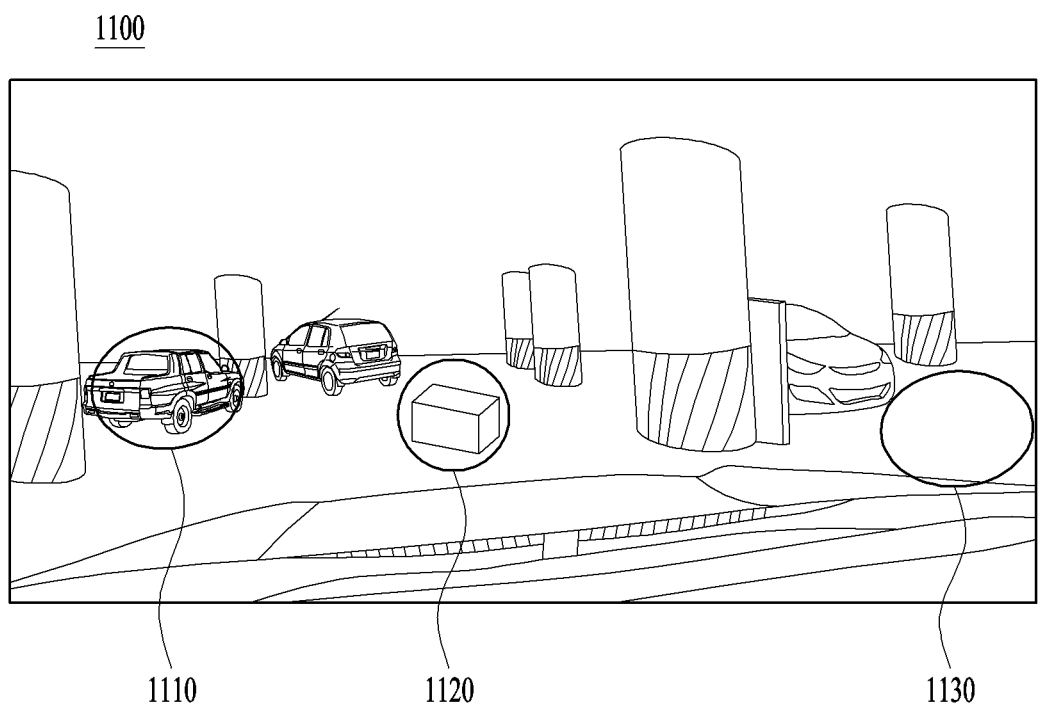
FIG. 11 is a view illustrating an example of route learning an example vehicle in the manual mode or the learning mode.

FIG. 11 is a view illustrating route learning of the processor of the vehicle 100 in the manual mode or the learning mode according to another implementation of the present disclosure.

Compared to FIGS. 9, 10A and 10B in which a route is learned based on information detected through the object detection device, FIG. 11 further illustrates correction of the learned route and input of additional information by a user input through the user interface device 200 in addition to the route learning.

For example, FIG. 11 illustrates an outside image 1100 of the vehicle 100, captured by the camera 310 of the object detection device 300. Upon receipt of a user input such as a touch input or a button input through the user interface device 200, the processor of the vehicle 100 may correct a learned route and receive additional information. The following may be taken as examples of the rout correction and the input of additional information.

First, if one other vehicle 1110 is parked at a specific location, the specific location may be set as a parking-available location.

Secondly, if there is an obstacle 1120 in the route, information indicating whether the obstacle 1120 is a temporary or permanent obstacle may be added.

Thirdly, if there is an available route 1130 other than the route in which the driver 100 has driven, the processor of the vehicle 100 may learn the route 1130 as an available route.

Besides, various pieces of information such as the speed of the vehicle 100 and the distance between vehicles may be added in response to a user input received through the user interface device 200.

Figure 12A:
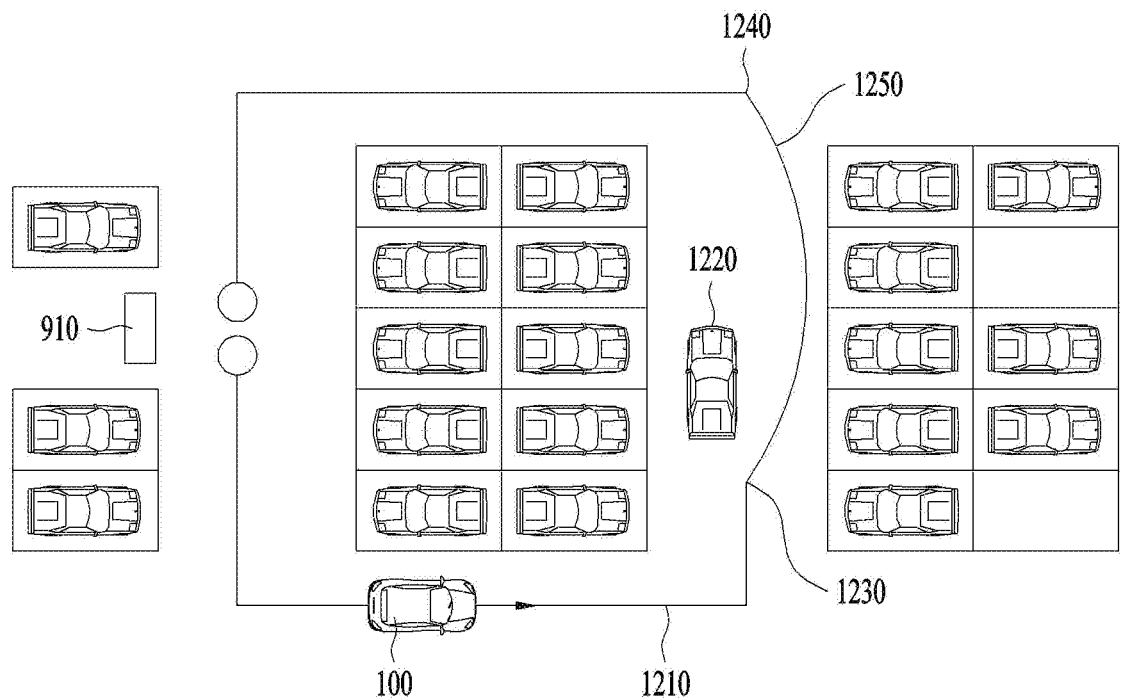
FIGS. 12A and 12B are views illustrating examples of route learning of an example vehicle in the manual mode or the learning mode.
Figure 12B:
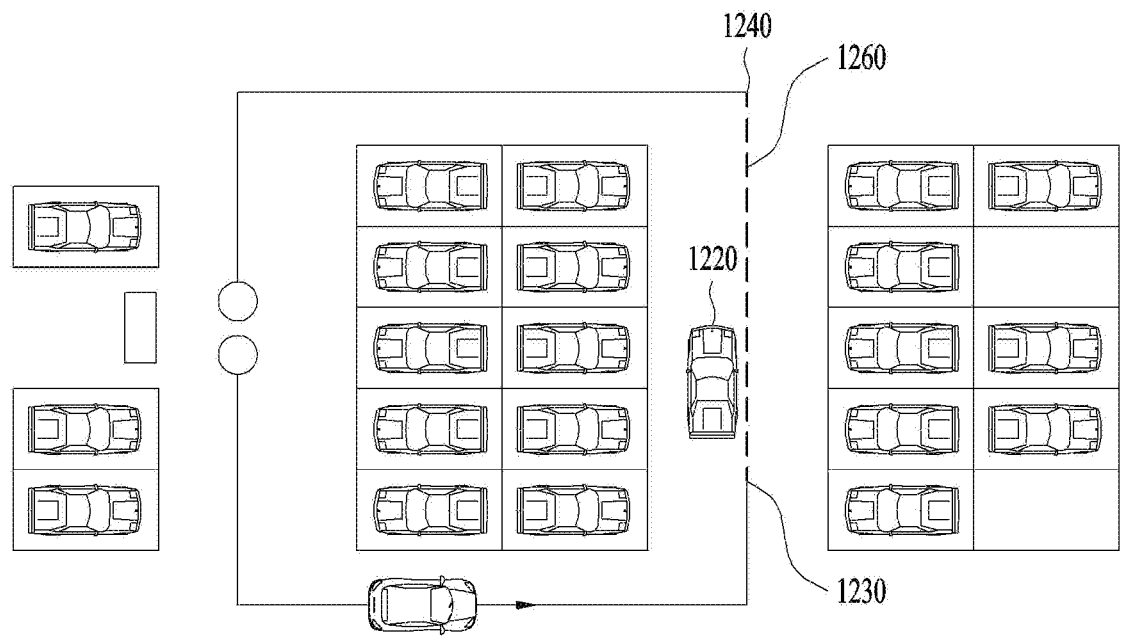

FIGS. 12A and 12B illustrate route learning of the processor of the vehicle 100 in the manual mode or the learning mode according to another implementation of the present disclosure.

According to another implementation of the present disclosure, the route learning step may further include a step of storing, as a learned route, a route other than a route in which the vehicle 100 has driven between a first location 1230 and a second location 1240 based on determined properties of objects between the first location 1230 and the second location 1240 in the driven route.

For example, a route 1210 and the route 1250 illustrated in FIG. 12A are routes in which the vehicle 100 has driven. Further, FIG. 12A illustrates driving of the vehicle 100 in the alternative route 1250 from the first location 1230 to the second location 1240 due to an obstacle 1220.

Referring to FIG. 12B, when the obstacle 1220 is set as a temporary obstacle such as a temporarily stopped other vehicle by a user input through the user interface device 200, or the processor of the vehicle 100 determines the obstacle 1220 as a temporary obstacle, the processor of the vehicle 100 stores the alternative route 1250 in which the vehicle 100 has actually driven, and another route 1260 between the first location 1230 and the second location 1240, as learned routes. The other route 1260 may be, for example, a shortest route, a minimum-time route, or a safer route, which connects the first location 1230 to the second location 1240.

In some examples, while not shown in FIGS. 12A and 12B, if the rotation angle of the steering wheel in the vehicle is less than or equal to a predetermined value within a specific section, the processor of the vehicle 100 may perceive a route in which the vehicle 100 has driven as a straight line or set the route as a shortest route.

The implementation of the present disclosure illustrated in FIGS. 12A and 12B achieves the technical effect that an optimum driving route may be provided for the vehicle 100 in the autonomous mode by modifying a route learned according to the type of an obstacle as well as an actually driven route.

Figure 13:
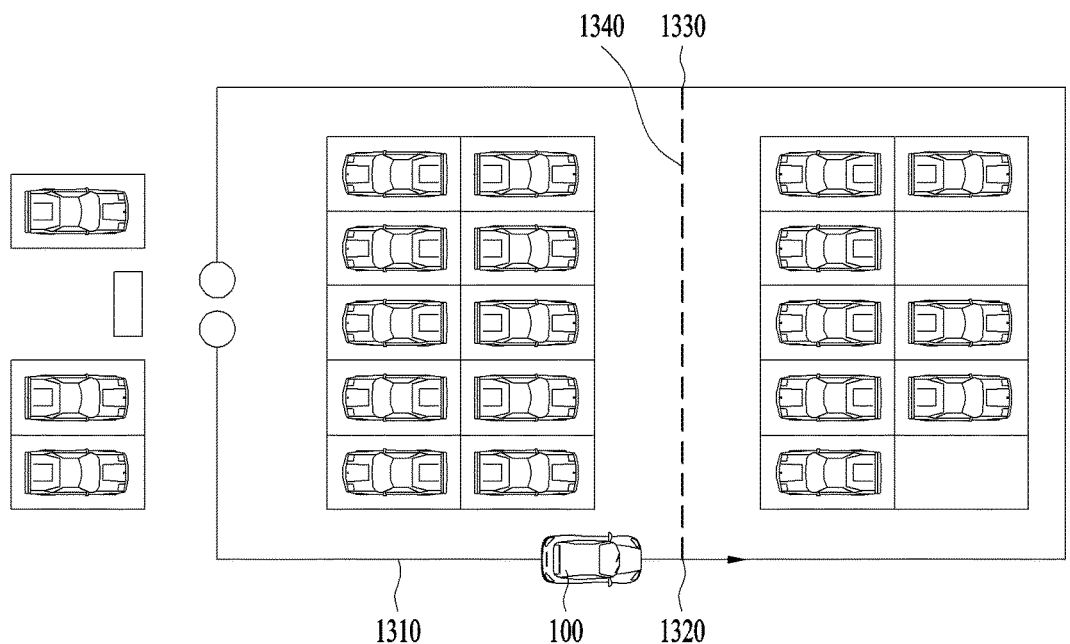
FIG. 13 is a view illustrating an example of route learning of an example vehicle in the manual mode or the learning mode.

FIG. 13 is a view illustrating route learning of the processor of the vehicle 100 in the manual mode or the learning mode according to another implementation of the present disclosure.

FIG. 13 illustrates arrival of the vehicle 100 at a branch point 1320 in the route learning step by the processor of the vehicle 100. The branch point (or intersection) is a point at which two or more paths meet or intersect.

In the example of FIG. 13, the object detection device 300 of the vehicle 100 detects an available space to the left of the vehicle 100 at the branch point 1320. For detection of the available space, the camera 310, the radar 320, the LIDAR 330, the ultrasonic sensor 340, and the IR sensor 350 may be used.

For example, the processor of the vehicle 100 may recognize the branch point 1320 when the processor detects the movable object entering a path that the vehicle 100 does not currently travel or the other vehicles parked along the path that the vehicle 100 does not currently travel.

Although the vehicle 100 drives straight ahead from the branch point 1320 in FIG. 13, the processor of the vehicle 100 stores information about the location of the branch point 1320, and information about a direction to the available space with respect to a driving route.

If the vehicle 100 reaches another branch point 1330, information about the location of the branch point 1330 and information about a direction to an available space with respect to a driving route are stored.

The processor of the vehicle 100 stores a new route connecting the two branch points 1320 and 1330 as a learned route in response to a user input received through the user interface device 200. Or, the processor of the vehicle 100 may autonomously store the new route connecting the two branch points 1320 and 1330 as a learned route.

Figure 14:
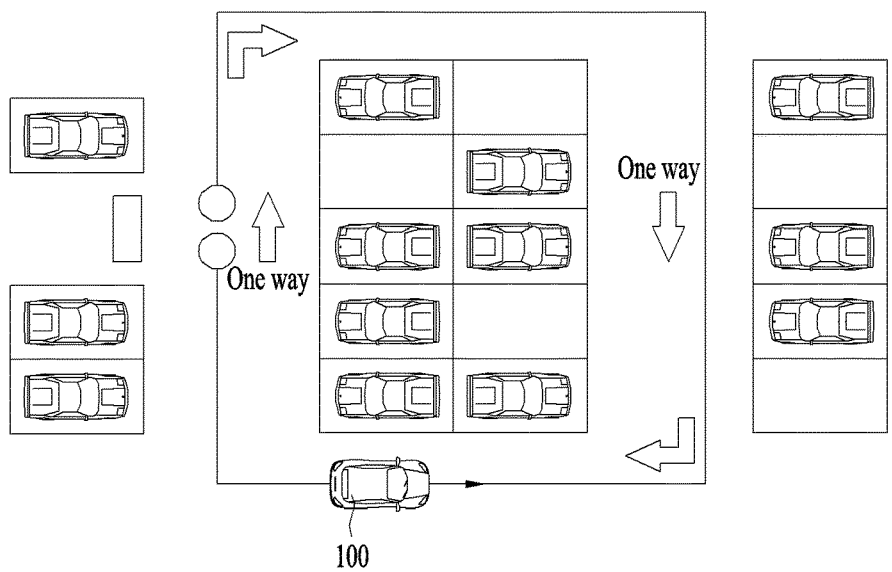
FIG. 14 is a view illustrating an example of route learning of an example vehicle in the manual mode or the learning mode.

FIG. 14 is a view illustrating route learning of the processor of the vehicle 100 in the manual mode or the learning mode according to another implementation of the present disclosure.

A parking space 1400 may be limited to a one-way driving direction.

For example, traffic is limited to one-way traffic in the clockwise direction in the parking space 1400 of FIG. 14.

If the vehicle 100 is to initiate learning or perform actual learning in the counter-clockwise direction, the processor of the vehicle 100 notifies the user that the vehicle 100 is driving in the wrong direction by controlling the output unit 250 of the user interface device 200.

Figure 15A:
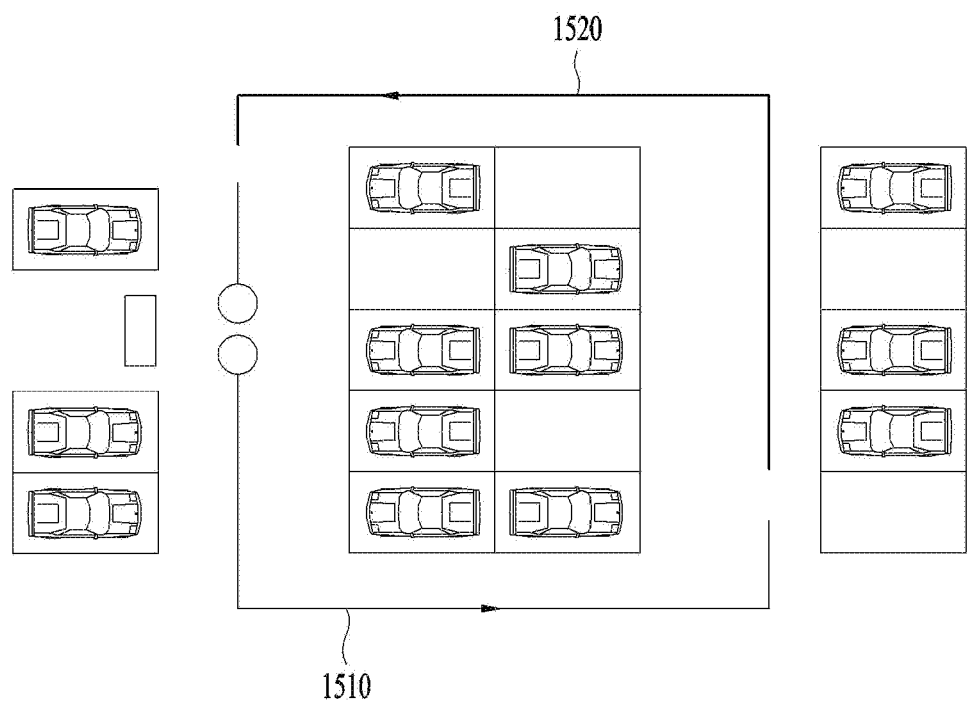
FIGS. 15A and 15B are views illustrating examples of route learning of an example vehicle in the manual mode or the learning mode.
Figure 15B:
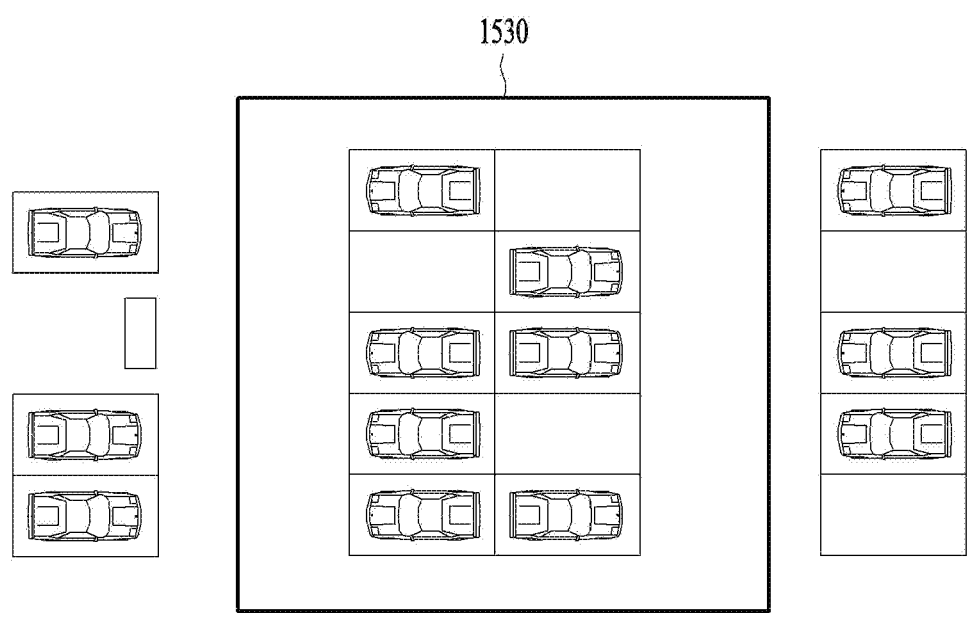

FIGS. 15A and 15B illustrates route learning of the processor of the vehicle 100 in the manual mode or the learning mode according to another implementation of the present disclosure.

It has been described before with reference to FIGS. 9 to 14 that one driving route is learned in one parking space. In contrast, according to another implementation of the present disclosure, a plurality of partial routes including a starting location and an ending location may be learned even in one parking space.

As illustrated in FIG. 15A, the processor of the vehicle 100 may learn two partial routes 1510 and 1520 having a starting location and an ending location. As illustrated in FIG. 15B, the processor of the vehicle 100 may generate a full route by incorporating the partial route 1510 with the partial route 1520 in response to a user input received through the user interface device 200, and store the generated full route in the memory 140. Or the processor of the vehicle 100 may autonomously generate the full route and store the generated full route in the memory 140, without a user input.

A description will be given of a processing method in the case where the processor of the vehicle 100 has received a user input for initiation of learning but has not received a user input for ending of the learning upon completion of parking of the vehicle 100, for the partial route 1510.

In this case, when the vehicle 100 is pulled out, the processor of the vehicle 100 may receive information indicating whether to learn the partial route 1520 successively to non-completed learning of the partial route 1510 from the user through the user interface device 200. Upon receipt of the user input, the processor of the vehicle 100 may generate a full route by incorporating the partial route 1510 with the partial route 1520, and store the generated full route in the memory 140.

In some implementations, when a first learned route and a second learned route which are different learned route are stored in the memory 140 and a first starting location of the first learned route and a second starting location of the second learned route are within a predetermined distance, the processor of the vehicle 100 may merge the first learned route and the second learned route. The processor of the vehicle 100 can use both the first learned route and the second learned route regardless of whether the starting location of the autonomous parking is the first starting location or the second starting location.

The methods of learning a route in the manual mode or the learning mode by the vehicle 100 have been described above with reference to FIGS. 8 to 15B. Now, a description will be given of methods for driving a vehicle in a learned route in the autonomous mode with reference to FIGS. 16 to 21B.

Figure 16:
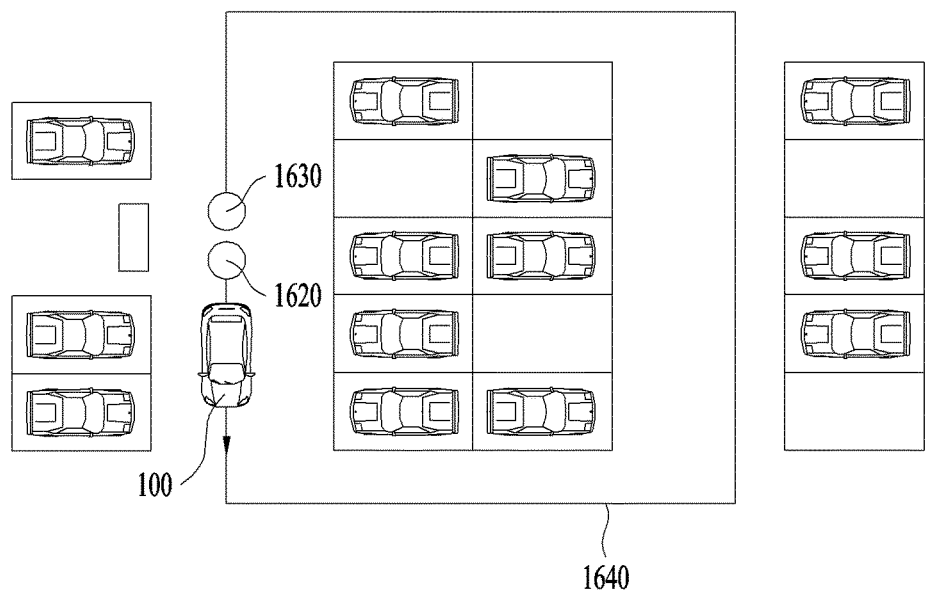
FIG. 16 is a view illustrating an example vehicle driving in an example learned route.

FIG. 16 is a view illustrating driving of the vehicle 100 in a learned route by the processor of the vehicle 100 according to an implementation of the present disclosure.

In the autonomous mode, the following conditions may be required to enable the vehicle 100 to start autonomous driving along a learned route 1640.

First, the vehicle 100 may reach within a predetermined distance (e.g., 2*m*) from a starting location 1620. The current location of the vehicle 100 may be detected through the camera 310 and the location information unit 420.

The processor of the vehicle 100 may pre-store semantic information such as a landmark in an image captured through the camera 310, and extracts the semantic information from an image captured through the camera 310 at the current location of the vehicle 100. The processor of the vehicle 100 compares the detected current location of the vehicle 100 with the starting location 1620 in the above operation.

Secondly, a user input through the user interface device 200 may be required, such as a button input for initiating autonomous driving. This is done to grant user input-based reliability to initiation of autonomous driving.

The foregoing two conditions are exemplary. Thus, both the conditions may be required, or only one of the conditions may be selectively required.

The processor of the vehicle 100 detects an empty parking slot during autonomous driving in the learned route 1640 from the starting location 1620 to the ending location 1630.

In some implementations, when the vehicle 100 autonomously drives along the learned route 1640 in the autonomous mode, the maximum speed of the vehicle 100 may be limited.

Figure 17:
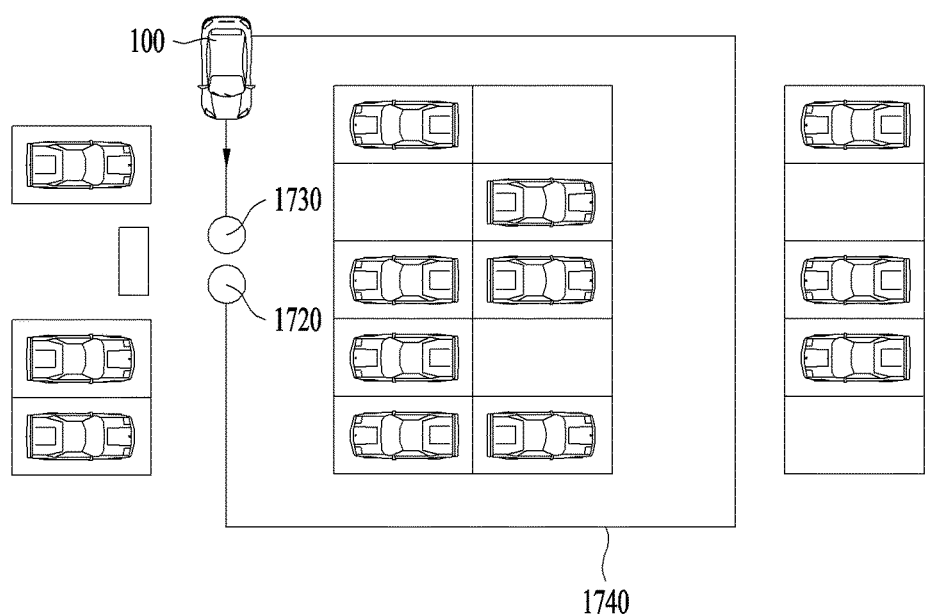
FIG. 17 is a view illustrating an example vehicle driving in an example learned route.

FIG. 17 is a view illustrating driving of the vehicle 100 in a learned route by the processor of the vehicle 100 according to an implementation of the present disclosure.

As illustrated in FIG. 17, the processor of the vehicle 100 may fail to detect an empty parking slot while the vehicle 100 is driving along a learned route 1740 from a starting location 1720 to an ending location 1730.

In this case, the processor of the vehicle 100 may pull over the vehicle 100 to the ending location 1730, and notify the user of failure in detecting a parking slot through the output unit 250.

Figure 18A:
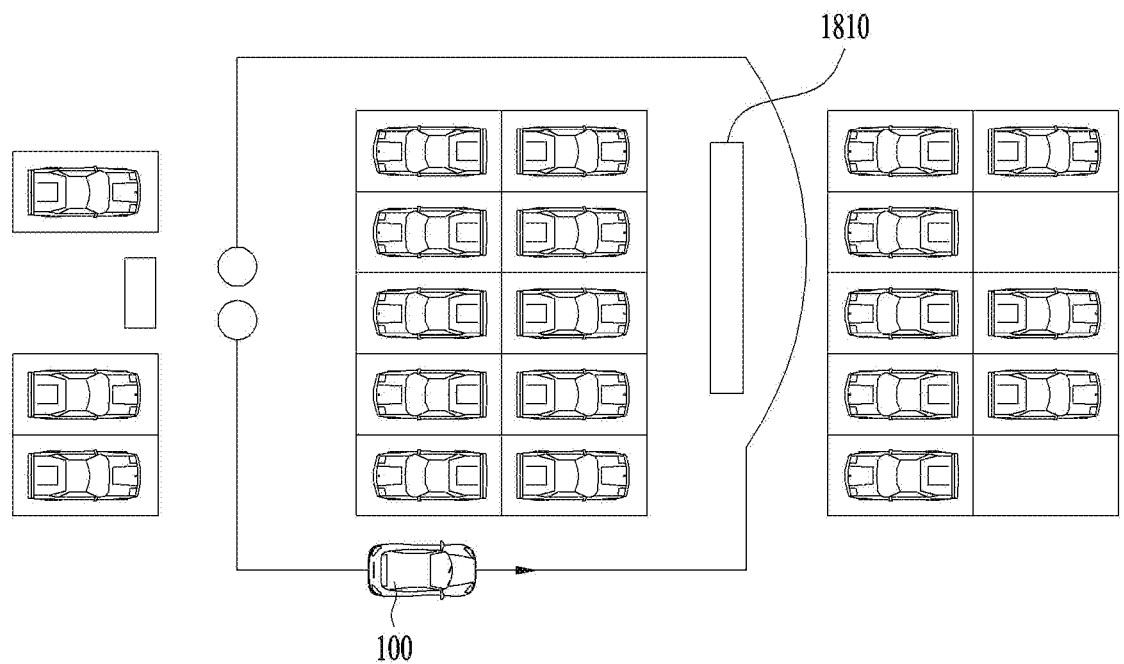
FIGS. 18A and 18B are views illustrating example vehicles driving in example learned routes.
Figure 18B:
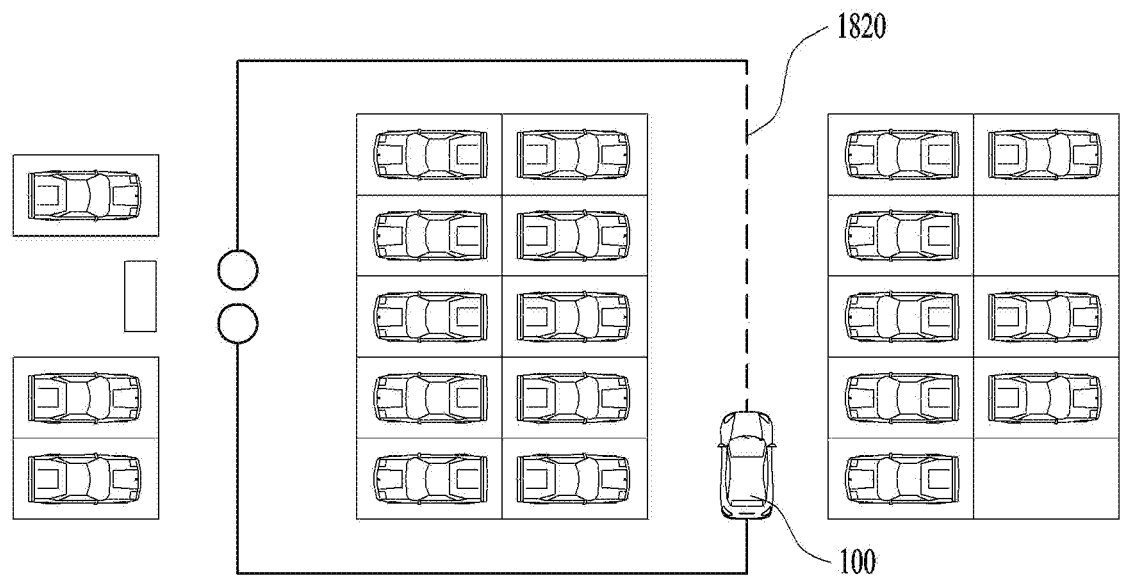

FIGS. 18A and 18B illustrate driving of the vehicle 100 in a learned route by the processor of the vehicle 100 according to an implementation of the present disclosure.

For example, FIGS. 18A and 18B illustrate generation of a new route in the autonomous mode, because of an obstacle 1810 which has been perceived as a fixed obstacle in the learning mode and disappeared with passage of time.

FIG. 18A illustrates route learning of the vehicle 100 by bypassing a fixed obstacle 1810 in the learning mode.

FIG. 18B illustrates driving of the vehicle 100 in a new route in the autonomous mode, due to disappearance of the fixed obstacle 1810. First, the vehicle 100 stops at a location where the fixed obstacle 1810 used to be. Then, the processor of the vehicle 100 notifies the user of disappearance of the fixed obstacle 1810 through the output unit 250.

Subsequently, the processor of the vehicle 100 requests the user to confirm whether to generate a new route 1820 through the output unit 250. Upon confirmation of generation of the new route 1820 by a user input through the user interface device 200, the processor of the vehicle 100 generates the new route 1820, and drives the vehicle 100 along the generated new route 1820.

In some implementations, upon detection of an obstacle which has not existed in the learning step, in the driving step, unlike FIGS. 18A and 18B, the processor of the vehicle 100 may calculate an expected time to collide with the obstacle based on the current speed of the vehicle 100 and the distance to the obstacle. If the expected time to collide is larger than a predetermined value, that is, a collision risk is not very high, the processor of the vehicle 100 may control deceleration of the vehicle 100 without stopping the vehicle 100 immediately.

Figure 19A:
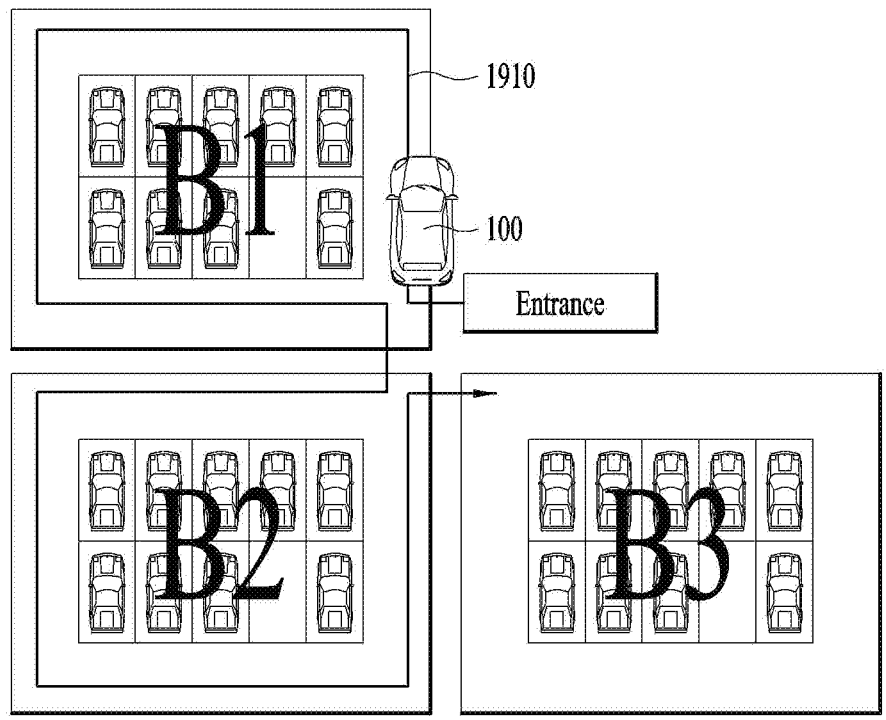
FIGS. 19A and 19B are views illustrating example vehicles driving in example learned routes.
Figure 19B:
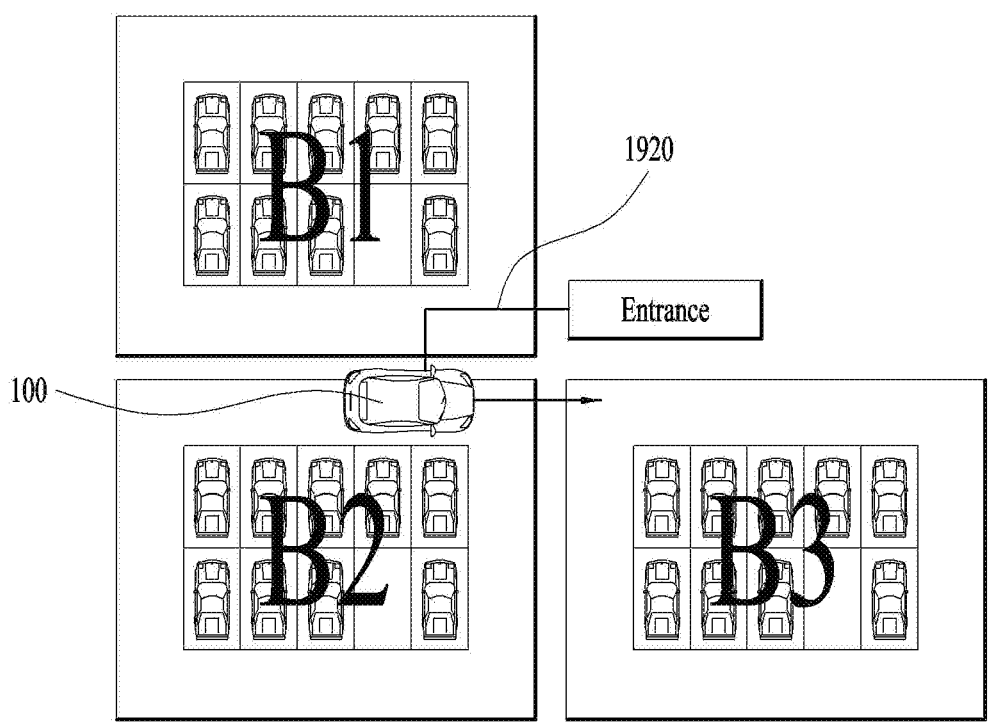

FIGS. 19A and 19B illustrate driving of the vehicle 100 in a learned route by the processor of the vehicle 100 according to an implementation of the present disclosure.

For example, FIGS. 19A and 19B describe the vehicle 100 driving in a learned route in a multi-story parking facility such as a tower parking system.

FIG. 19A illustrates driving of the vehicle 100 in a learned route 1910 in order from the first basement to the third basement.

In some implementations, the communication device 400 of the vehicle 100 may receive additional information about use of the parking facility from an external device such as a parking lot server. In FIGS. 19A and 19B, the communication device 400 of the vehicle 100 receives additional information indicating that parking is not allowed in the first and second basements from the parking lot server, by way of example.

In this case, the processor of the vehicle 100 may modify the learned route by reflecting the received additional information. That is, as illustrated in FIG. 19B, the processor of the vehicle 100 may generate a new route 1920 which directly runs to the third basement, without driving in the learned route 1910 in the first and second basements.

Subsequently, the processor of the vehicle 100 controls driving of the vehicle 100 along the generated route 1920.

The implementation of the present disclosure illustrated in FIGS. 19A and 19B achieves the technical effect that instead of unconditionally driving in a learned route from a starting location to an ending location, the vehicle 100 generates an optimum driving route based on information received from an external device.

FIG. 20 is a view illustrating driving of the vehicle 100 in a learned route by the processor of the vehicle 100 according to an implementation of the present disclosure.

FIG. 20 illustrates adaptive change of a driving route of the vehicle 100 in the autonomous mode based on information input directly by a user.

The user may set an exclusion list 2000 illustrated in FIGS. 10A and 10B and store the exclusion list 2000 in the memory 140.

For example, the exclusion list 2000 includes information indicating parking not allowed on the first basement on March 1 to March 3, and information indicating parking not allowed on the second basement on April 1 to April 8.

Once the exclusion list 2000 is set, the processor of the vehicle 100 may generate a first parking profile (parking profile 1) 2010 to a second parking profile (parking profile 2) 2020 on a date basis by reflecting the set exclusion list 2000.

For example, the processor of the vehicle 100 may add information indicating parking not allowed on the second basement by reflecting information of the exclusion list 2000 in parking profile 1 2010 for April 3. Further, the processor of the vehicle 100 may add information indicating parking allowed on all of the first, second, and third basements by reflecting the information of the exclusion list 2000 in parking profile 2 2020 for April 10.

In this manner, the processor of the vehicle 100 may generate per-date parking profiles by reflecting information received from the user through the user interface device 200, and adaptively change a driving route of the vehicle 100 in the autonomous mode by applying the per-date parking profiles.

Figure 21A:
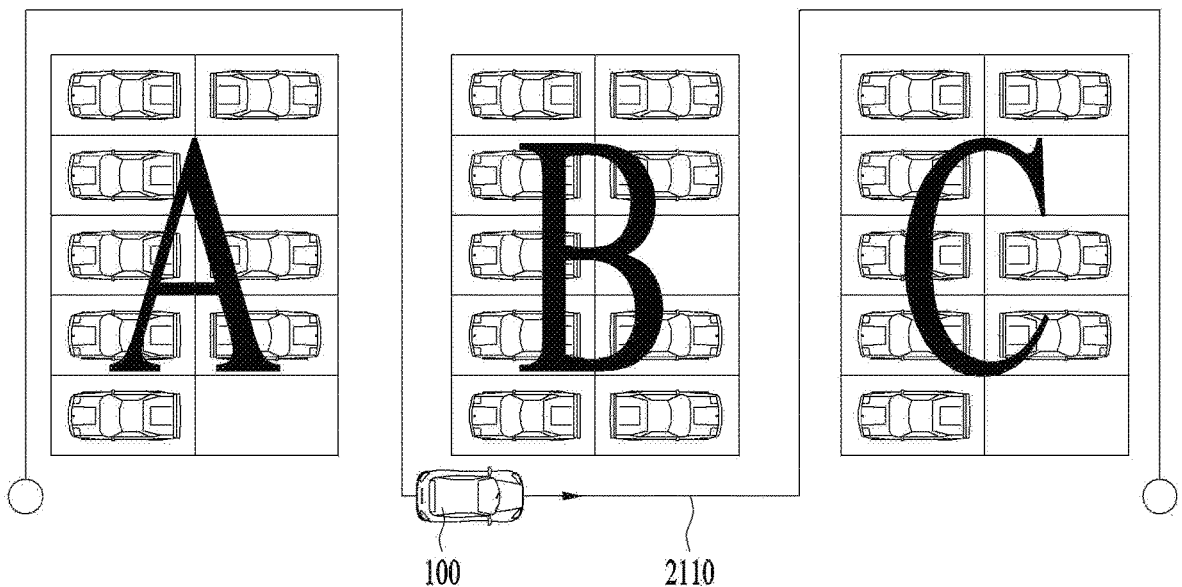
FIGS. 21A and 21B are views illustrating example vehicles driving in example learned routes.
Figure 21B:
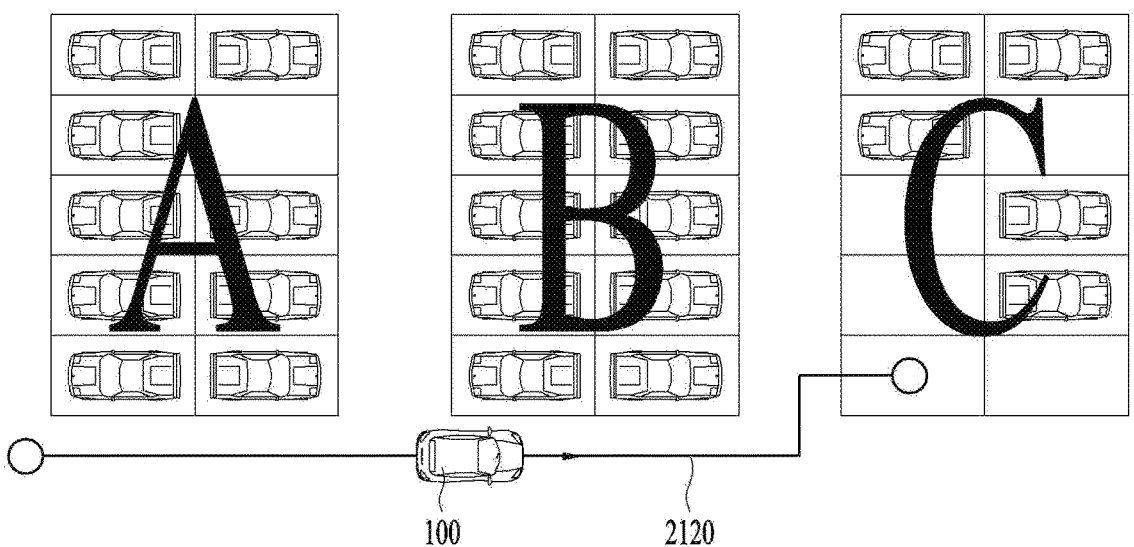

FIGS. 21A and 21B illustrates driving of the vehicle 100 in a learned route by the processor of the vehicle 100 according to an implementation of the present disclosure.

For example, FIGS. 21A and 21B illustrate the vehicle 100 that drives in a route modified by reflecting various pieces of information, rather than the vehicle 100 unconditionally drives from a starting location to an ending location along a learned route.

As illustrated in FIGS. 21A and 21B, the processor of the vehicle 100 may additionally learn an available parking space by time or day and reflect the learned parking space in a parking route.

For example, the processor of the vehicle 100 may generate a route 2120 which directly runs to section C expected to have lots of current empty parking slots as illustrated in FIG. 21B, instead of driving along a learned route 2110 as illustrated in FIG. 21A. However, a user input received through the user interface device 200 may be used in this operation.

As shown in FIGS. 21A and 21B, the processor of the vehicle 100 may learn user parking patterns by time or by day and reflect the learned user parking patterns in a parking route.

For example, if the user often parks the vehicle 100 in section A near to an elevator in the morning, the processor of the vehicle 100 may learn a related parking pattern and drive the vehicle 100 along the route 2110, as illustrated in FIG. 21A.

In some examples, If the user often parks the vehicle 100 in section C on weekends, the processor of the vehicle 100 may learn a related parking pattern and drive the vehicle 100 along the route 2120, as illustrated in FIG. 21B.

In some implementations, the processor of the vehicle 100 may learn the parking pattern of the vehicle 100 in the autonomous mode in the learned route.

The methods of driving a vehicle along a learned route in an autonomous mode have been described above with reference to FIGS. 16 to 21B. Now, a description will be given of methods of parking the vehicle 100 in an empty parking slot in a learned route by the processor of the vehicle 100 with reference to FIGS. 22, 23A, 23B, and 24A to 24D.

Figure 22:
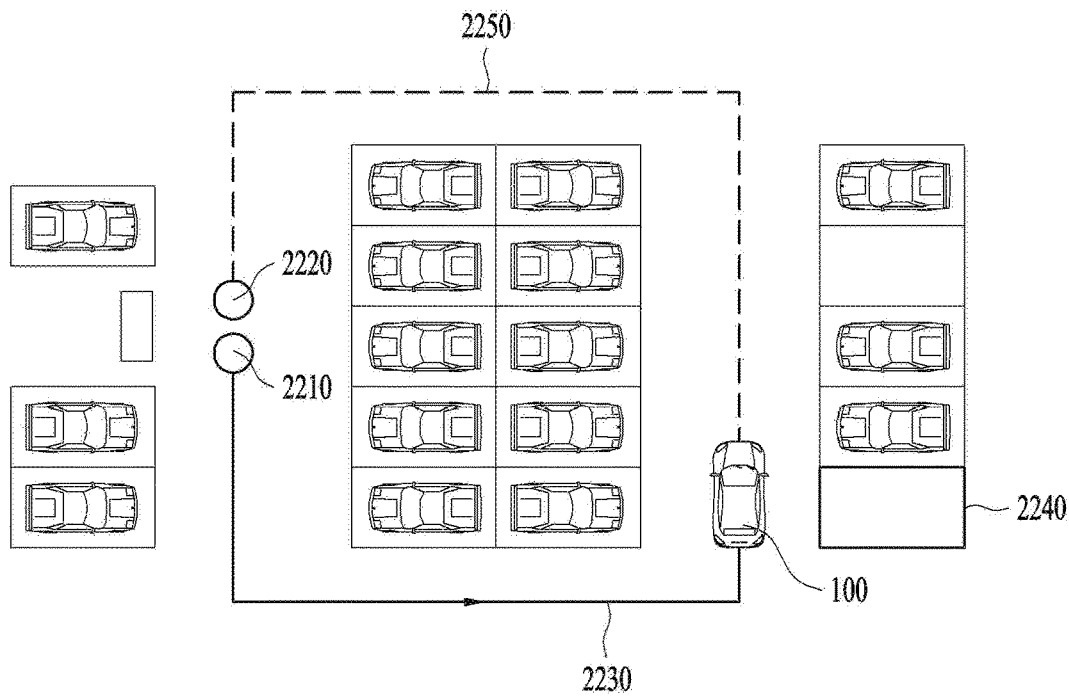
FIG. 22 is a view illustrating an example vehicle parking in an empty parking slot in an example learned route.

FIG. 22 is a view illustrating parking of the vehicle 100 in an empty parking slot in a learned route by the processor of the vehicle 100 according to an implementation of the present disclosure.

Once the vehicle 100 starts to drive along a learned route 2230 from a starting location 2210 in the autonomous mode, the processor of the vehicle 100 searches for an empty parking slot by controlling the object detection device 300.

If the vehicle 100 reaches an empty parking slot 2240, the processor of the vehicle 100 detects the parking slot 2240 by controlling the camera 310, the radar 320, the LIDAR 330, the ultrasonic sensor 340, and the IR sensor 350 of the object detection device 300.

Further, the processor of the vehicle 100 may detect the empty parking slot 2240, using information about the properties of objects stored in the route learning step. For example, the processor of the vehicle 100 may detect the empty parking slot 2240 by detecting a parking line or a location at which another vehicle was parked in the afore-described learning step. For example, the vehicle 100 may search empty parking slots while traveling along the space stored in the map data as a parking slot and along the parking slot in which other vehicles was parked.

Further, the processor of the vehicle 100 may receive information related to a parking slot from an infrastructure through the V2X communication unit 430. Based on the received information, vehicle 100 may search the empty parking slots.

That is, the processor of the vehicle 100 may detect the empty parking slot 2240 more accurately using information about an obstacle in the route, stored in the learning step as well as the result of detection of the object detection device 300.

Subsequently, the processor of the vehicle 100 automatically parks the vehicle 100 in the detected parking slot 2240 by controlling the afore-described parking system 750.

In some implementations, if a plurality of parking slots are detected, a step of selecting a specific parking slot may be added. The processor of the vehicle 100 may preset the priorities of parking slots. For example, the parking slots may be prioritized in an order of the distances from an exit to the parking slots. In this case, upon detection of a plurality of parking slots, the processor of the vehicle 100 may control parking of the vehicle 100 in a parking slot nearer to the exit.

Alternatively, various factors such as whether there is a parking line in the parking slot, the size of the parking slot, frequently parked parking slot and parking slot for disabled may be considered as priorities for the parking slot.

In some implementations, the processor of the vehicle 100 may store information about the location of the empty parking slot 2240. When the vehicle 100 is to be pulled out, the processor of the vehicle 100 may determine whether to return to the starting location 2210 along the route 2230 in which the vehicle 100 has driven for parking or go to the ending location 2220 along the other route, based on the stored location information.

Figure 23A:
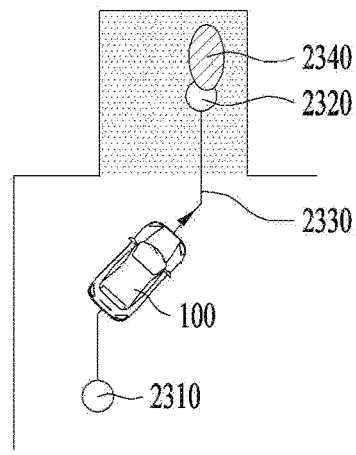
FIGS. 23A and 23B are views illustrating an example vehicle parking in an empty parking slot in an example learned route.
Figure 23B:
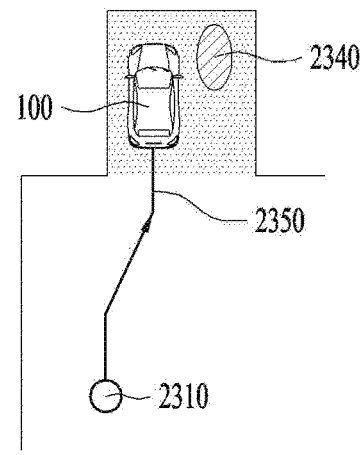

FIGS. 23A and 23B illustrate parking of the vehicle 100 in an empty parking slot in a learned route by the processor of the vehicle 100 according to an implementation of the present disclosure.

For example, FIGS. 23A and 23B depict a method for modifying a learned parking route in the presence of an obstacle absent in the learning step during parking, for a designated or reserved parking slot of a personal parking space such as a garage. In FIG. 23A, an ending location 2320 corresponds to the location of the reserved parking slot.

When the vehicle 100 is to be parked in the reserved parking slot, if an object which has not been detected in the route learning step is detected in the reserved parking slot, the processor of the vehicle 100 determines an available area for parking the vehicle 100 in consideration of an area occupied by the object in the reserved parking slot. Subsequently, the processor of the vehicle 100 parks the vehicle 100 in the available area.

For example, FIG. 23A illustrates driving of the vehicle 100 along a learned driving route 2330 from a starting location 2310 to the ending location 2320. More specifically, unlike the afore-described implementation of FIG. 22, FIG. 23A illustrates that an obstacle 2340 absent in the learning step obstructs automatic parking of the vehicle 100 at the ending location 2320.

If the unexpected obstacle 2340 obstructs parking at the ending location 2320 as described above, the processor of the vehicle 100 detects the obstacle 2340 through the object detection device 300 as illustrated in FIG. 23B.

Then, the processor of the vehicle 100 determines whether the vehicle 100 may be parked in an area except for an area occupied by the obstacle 2340 in the parking slot.

Finally, the processor of the vehicle 100 controls parking of the vehicle 100 by generating a new route 2350 which allows parking with the obstacle 2340 avoided.

FIGS. 24A to 24D illustrate parking of the vehicle 100 in an empty parking slot in a learned route by the processor of the vehicle 100 according to an implementation of the present disclosure.

FIGS. 24A to 24D illustrate other implementations of the present disclosure related to FIGS. 23A and 23B. For example, in the presence of an obstacle which has not existed in a learned parking slot in the learning step, a new route for parking through obstacle avoidance is generated in FIGS. 24A to 24D.

Since the parking slot illustrated in FIGS. 23A and 23B is in a personal parking space such as a garage, there is no need for considering other vehicles. On the contrary, parking slots illustrated in FIGS. 24A to 24D are in a public parking lot. Thus, it is important not to obstruct parking and pulling-out of other vehicles.

Figure 24A:
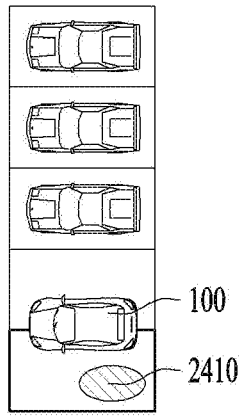
FIGS. 24A to 24D are views illustrating an example vehicle parking in an empty parking slot in an example learned route.
Figure 24B:
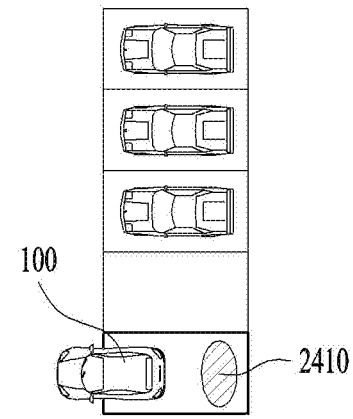
Figure 24C:
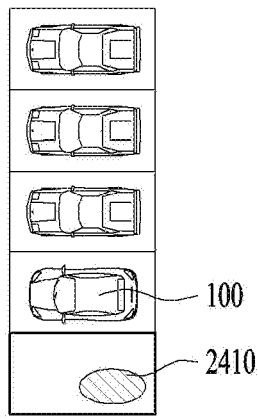
Figure 24D:
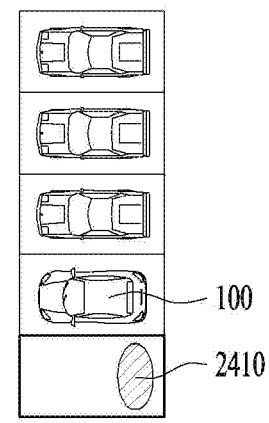

FIGS. 24A to 24D illustrate the presence of an obstacle 2410 which has not existed in the learning step, in a parking slot. In this case, the processor of the vehicle 100 controls parking of the vehicle 100 in a parking slot next to the parking slot having the obstacle 2410 by recognizing parking lines as illustrated in FIGS. 24C and 24D, rather than the processor of the vehicle 100 simply generates a parking trace for avoiding the obstacle as illustrated in FIGS. 24A and 24B.

In this manner, the present disclosure according to the implementation of FIGS. 24A to 24D achieves the technical effect that driving and parking of other vehicles are not obstructed by perceiving the ambient space of a vehicle, in obstacle-avoiding parking.

The methods of parking the vehicle 100 in an empty parking slot in a learned route by the processor of the vehicle 100 have been described above with reference to FIGS. 22, 23A, 23B, and 24A to 24D. Now, a description will be given below of learning-based vehicle pulling-out methods according to implementations of the present disclosure, with reference to FIGS. 25 to 31.

Figure 25:
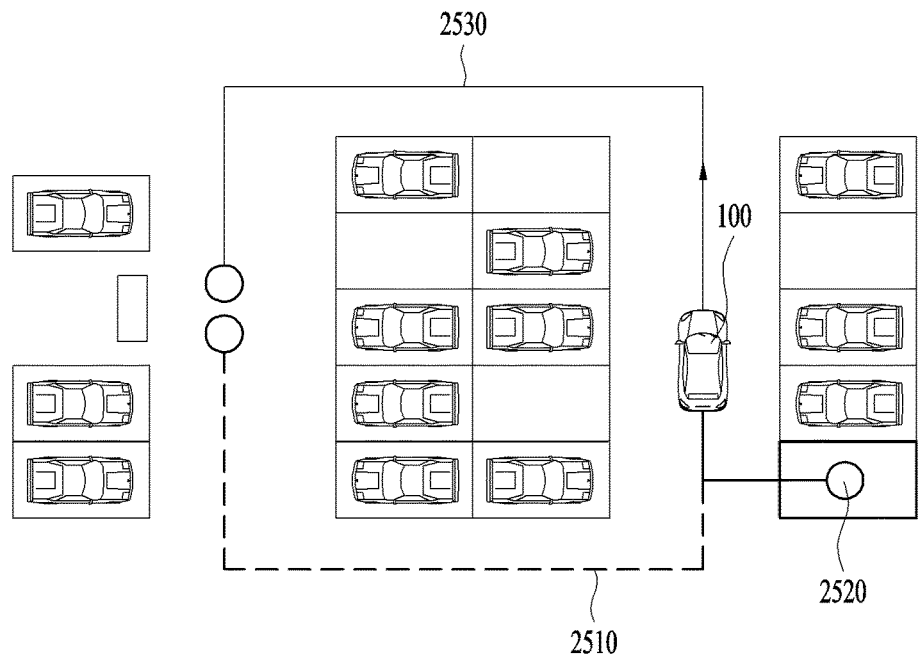
FIG. 25 is a view illustrating another example of a learning-based vehicle pulling-out method.

FIG. 25 is a view illustrating a learning-based vehicle pulling-out method according to an implementation of the present disclosure.

FIG. 25 illustrates a pulling-out process after the vehicle 100 was parked in a detected parking slot according to the implementations of FIGS. 22, 23A, 23B, and 24A to 24D.

Before the pulling-out process, when parking the vehicle 100 in a detected parking slot 2520, the processor of the vehicle 100 stores information about the location of the detected parking slot 2520 in the memory 140.

After the vehicle 100 is parked, the processor of the vehicle 100 receives a user input for pulling out the vehicle 100 through the user interface device 200.

The processor of the vehicle 100 reads out the information about the location of the parking slot 2520 in which the vehicle 100 has been parked, and information about a learned route 2530 from the memory 140 in response to the user input.

The processor of the vehicle 100 generates the pull-out route 2530 running from the parking slot to an ending location, including at least a part of the learned route, and controls pulling-out of the vehicle 100 along the generated pull-out route 2530.

In some implementations, as shown FIG. 25, the processor of the vehicle 100 may tore information about a parking trace in the parking step, and control pulling-out of the vehicle 100, using the stored information about the parking trace during pull-out.

In some implementations, it may occur that the vehicle 100 returns to a starting location before the vehicle 100 is parked in a parking slot, unlike FIG. 25. For example, after the user gets off the vehicle 100 at the starting location and the vehicle 100 starts to drive in a learned route in the autonomous mode, the user may want the vehicle 100 to return to the starting location again.

The processor of the vehicle 100 receives a user input requesting the vehicle 100 to return to the starting location or the ending location through the user interface device 200. For the convenience of description, the request is referred to as a roll-back request.

Upon receipt of the roll-back request, the processor of the vehicle 100 determines the location of the vehicle 100 in learned routes 2510 and 2530. The processor of the vehicle 100 determines whether to continue driving in a current driving direction or drive in a direction opposite to the current driving direction, based on the determined location of the vehicle 100.

For example, when the distance from the current location of the vehicle 100 to the ending location is shorter than the distance from the starting location to the current location of the vehicle 100, the processor of the vehicle 100 may continue to travel keeping the driving direction. On the contrary, when the distance from the current location of the vehicle 100 to the ending location is longer than the distance from the starting location to the current location of the vehicle 100, the processor of the vehicle 100 may control the vehicle 100 to travel to the starting location again by changing the driving direction.

In some implementations, the distance from the starting location to the current location of the vehicle 100 may be the distance of the learned route 2510 traveled by the vehicle 100. In this case, the distance from the current location of the vehicle 100 to the ending location may be the distance of the learned route 2530.

Alternatively, the distance from the starting location to the current location of the vehicle 100 may corresponds to an elapsed time for travelling from the starting location to the current location of the vehicle 100. In this case, the distance from the current location of the vehicle 100 to the ending location may correspond to an expected time for reaching the ending location from the current location of the vehicle 100.

In some implementations, when the distance from the current location of the vehicle 100 to the ending location is longer than the distance from the starting location to the current location of the vehicle 100, the processor of the vehicle 100 may control the vehicle 100 to reach the ending location when it is determined that it is impossible to change the driving direction due to the rear obstacle or one-way road.

In some implementations, when the starting location and the ending location are separated by a predetermined distance or more, the processor of the vehicle 100 responds to the roll-back request so that the vehicle 100 reaches the starting location or the location designated by the user regardless of the current location of the vehicle 100.

In this case, when it is determined that it is impossible to change the driving direction due to the rear obstacle or one-way road, the processor of the vehicle 100 may control the vehicle 100 to reach the ending location even when receiving the roll-back request from the user.

As well as the distance from the starting location to the current location of the vehicle 100, various factors for determining whether to maintain the driving direction can be considered. For example, whether a roll-back request is received within a predetermined time (for example, one minute), the remaining time until parking is completed, the progress indicating the parking process, the distance that the vehicle 100 is apart from the user and the like can be considered.

If determining to drive in the opposite direction to the current driving direction, the processor of the vehicle 100 stops the vehicle 100 and detects a space in which the driving direction is to be changed, through the object detection device 300. Finally, the processor of the vehicle 100 controls change of the driving direction of the vehicle 100 in the detected space, and drives the vehicle 100 to return to the starting location or the ending location.

Alternatively, the processor of the vehicle 100 may control the transmission drive unit 612 to adjust the transmission state from the forward direction D to the reverse direction R and control the vehicle 100 to return to the starting location.

The roll-back process in the parking process of the vehicle 100 has been described above. Hereinafter, the roll-back process in the pulling-out process will be described. In the pulling-out process, the user may want the vehicle 100 to return to the parking slot that the vehicle 100 was parked and to be parked again.

When the vehicle 100 receives a roll-back request while being within a predetermined distance from the parking slot 2520, the processor of the vehicle 100 may control the vehicle 100 to return to the parking slot that the vehicle 100 was parked and to be parked again. On the contrary, when the vehicle 100 receives a roll-back request while being out of a predetermined distance or more from the parking slot 2520, the processor of the vehicle 100 may detect another available parking slot and control the vehicle 100 to be parked in the another parking slot.

In some implementations, the processor of the vehicle 100 may set the above mentioned 'predetermined distance' differently based on whether the starting location and the ending location are the same (including substantially same) or not.

Further, when the starting location and the ending location are separated by a predetermined distance or more, the processor of the vehicle 100 may control the vehicle 100 to search for an available parking slot while traveling toward the ending location.

Figure 26:
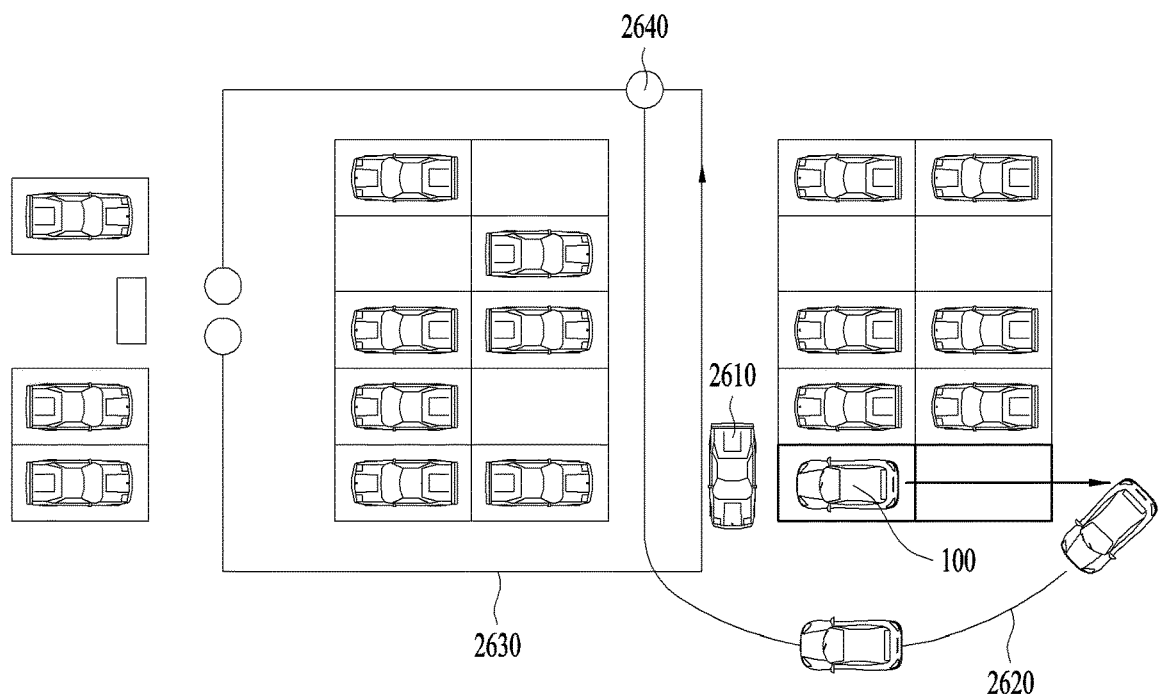
FIG. 26 is a view illustrating another example of a learning-based vehicle pulling-out method.

FIG. 26 is a view illustrating a learning-based vehicle pulling-out method according to another implementation of the present disclosure.

For example, FIG. 26 illustrates generation of a new pull-out route, in the case where the vehicle 100 may not pull out of a parking slot using information about a parking trace stored in the parking step due to one other vehicle 2610 in front of the parking slot.

The object detection device 300 of the vehicle 100 may detect an object outside the vehicle 100. In the example of FIG. 26, the processor of the vehicle 100 may acquire information indicating the presence of the other vehicle 2610 in front of the vehicle 100 and information indicating the absence of an obstacle behind the vehicle 100 through the object detection device 300.

Subsequently, the processor of the vehicle 100 generates a new driving route 2620 in which the vehicle 100 may move backward and then return to a learned driving route 2630. Then, the processor of the vehicle 100 controls driving of the vehicle 100 along the generated driving route 2620.

A method of detecting that the vehicle 100 has returned to the learned driving route 2630 will be described below. First, the processor of the vehicle 100 determines the current location of the vehicle 100 through the object detection device 300, the location information unit 420, and so on.

Subsequently, the processor of the vehicle 100 determines whether meaningful information such as a corner or a landmark like a geographical feature stored in the learning step has been detected in an image captured through the camera 310 at the current location of the vehicle 100. Upon detection of the meaningful information, the processor of the vehicle 100 may determine that the processor 100 has reached the learned route 2630.

If the vehicle 100 has reached the existing learned driving route 2630 at a location 2640, the processor of the vehicle 100 controls pulling-out of the vehicle 100 along the existing learned driving route 2630.

In this manner, the present disclosure according to the implementation of FIG. 26 achieves the technical effect that a pull-out route changed adaptively according to an ambient environment condition of a vehicle is generated during pull-out.

Figure 27:
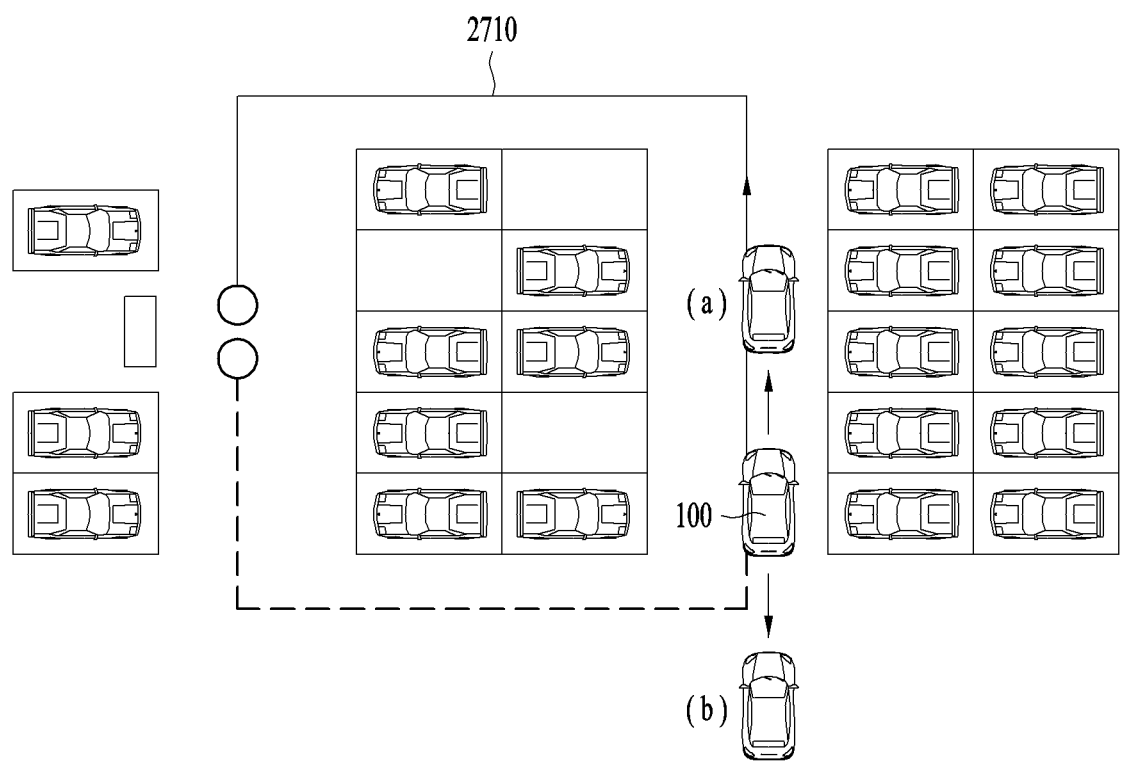
FIG. 27 is a view illustrating another example of a learning-based vehicle pulling-out method.

FIG. 27 is a view illustrating a learning-based vehicle pulling-out method according to another implementation of the present disclosure.

FIG. 27 illustrates a case in which the location of the vehicle 100 has been changed after the vehicle 100 was parked, like forward or backward movement of the vehicle 100 by external force after double-parking of the vehicle 100.

With reference to FIG. 27, a case in which the changed location of the vehicle 100 is in an existing learned route and a case in which the changed location of the vehicle 100 is outside the existing learned route will be described separately. The processor of the vehicle 100 may determine the changed location of the vehicle 100 through the object detection device 300.

If the changed location of the vehicle 100 is in an existing learned route, that is, if the vehicle 100 moves forward to position (a) in FIG. 27, the processor of the vehicle 100 controls pulling-out of the vehicle 100 along an existing learned route 2710.

On the other hand, if the changed location of the vehicle 100 is outside the existing learned route, that is, if the vehicle 100 moves backward to position (b) in FIG. 27, the processor of the vehicle 100 generates a route in which to reach the existing learned route 2710, and controls pulling-out of the vehicle 100 along the generated route and the existing learned route 2710, in the method described with reference to FIG. 26.

Figure 28A:
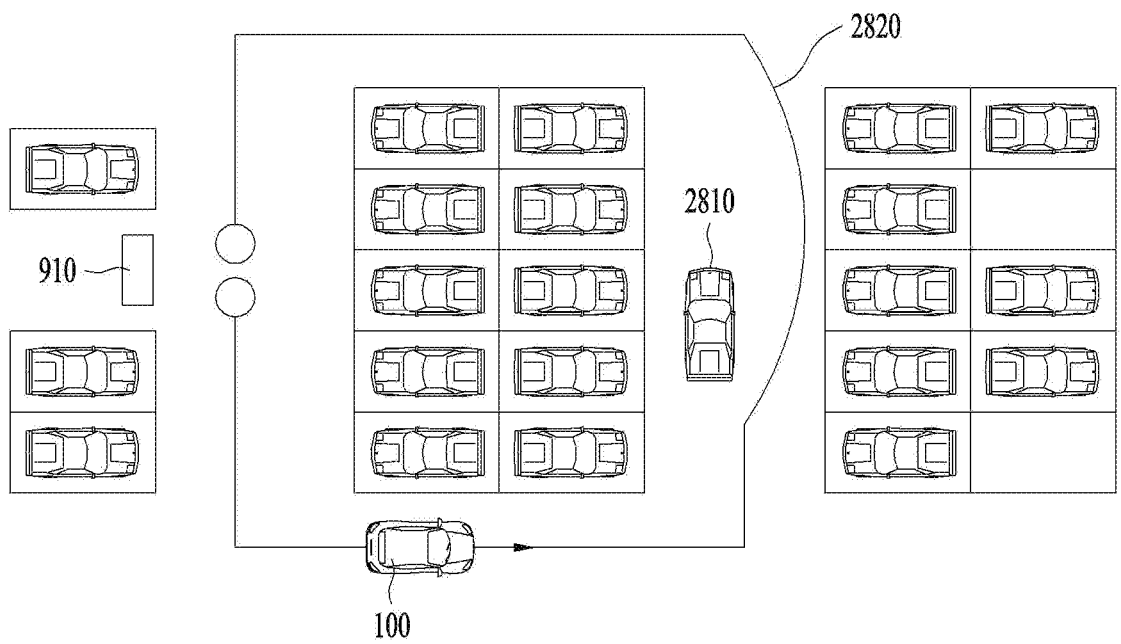
FIGS. 28A and 28B are views illustrating examples of a learning-based vehicle pulling-out method.
Figure 28B:
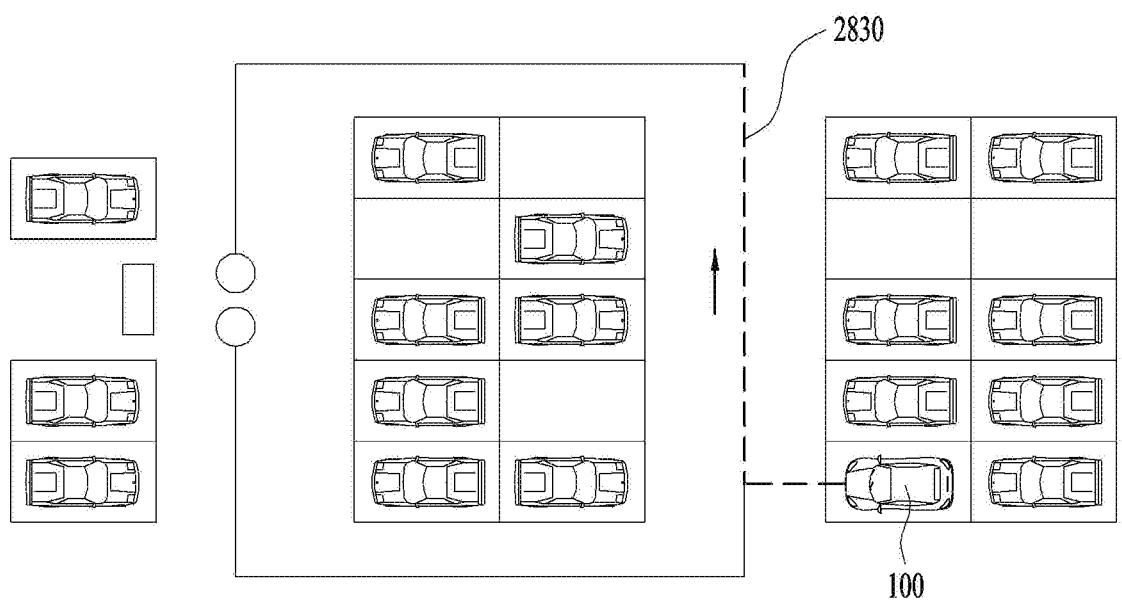

FIGS. 28A and 28B illustrates a learning-based vehicle pulling-out method according to another implementation of the present disclosure.

The example shown in FIGS. 28A and 28B is related to the example shown in FIGS. 12A and 12B. In FIGS. 12A and 12B, even though the vehicle 100 learns a driving route that avoids an obstacle due to the obstacle in the learning step, if the obstacle is a temporary obstacle, the processor of the vehicle 100 stores, as a learned route, a shortest route instead of the route in which the vehicle 100 has driven, avoiding the obstacle.

In some implementations, the processor of the vehicle 100 learns a driving route that avoids an obstacle 2810 in the learning step in FIG. 28A. Then, if the processor of the vehicle 100 determines that the object 2810 has disappeared, through the object detection device 300 in the pull-out step, the processor of the vehicle 100 generates a shortest route 2830, not the existing learned route 2820, and controls pulling-out of the vehicle 100 along the generated shortest route 2830, as illustrated in FIG. 28B.

For example, FIGS. 12A and 12B depict a method of storing a learned route as a shortest route, whereas FIGS. 28A and 28B depict a method of generating a shortest route during pull-out, while storing a learned route as an avoidance driving route.

FIGS. 29A to 29D illustrate a learning-based vehicle pulling-out method according to another implementation of the present disclosure.

According to another implementation of the present disclosure illustrated in FIGS. 29A to 29D, the processor of the vehicle 100 may automatically change a pull-out route by reflecting changed ambient environment information of the vehicle 100. That is, the processor of the vehicle 100 may detect an object outside the vehicle 100 through the object detection device 300, and generate a favorable route to reach a learned route based on the detected object.

Figure 29A:
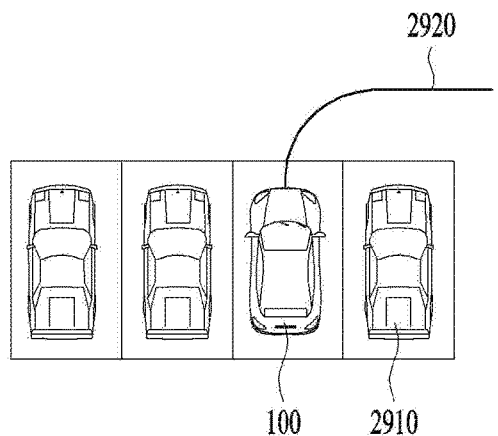
FIGS. 29A to 29D are views illustrating examples of a learning-based vehicle pulling-out method.
Figure 29B:
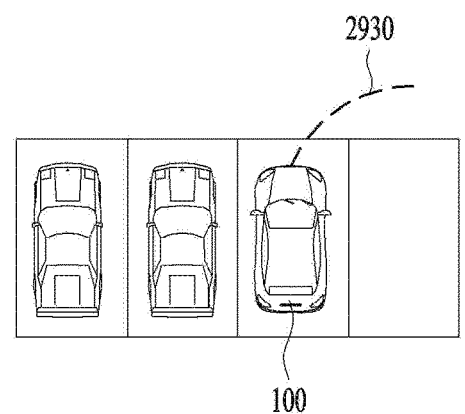
Figure 29C:
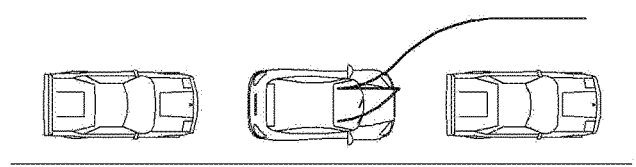
Figure 29D:
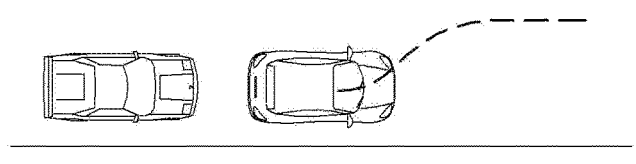

FIGS. 29A and 29B illustrate vertical parking of the vehicle 100, and FIGS. 29C and 29D illustrate parallel parking of the vehicle 100.

FIG. 29A illustrates that a pull-out route 2920 is learned due to one other vehicle 2910 parked to the right of the vehicle 100. On the other hand, since there are no obstacles including the other vehicle 2910 to the right of the vehicle 100, the processor of the vehicle 100 controls pulling-out of the vehicle 100 by generating an easier or more favorable pull-out route 2930.

Similarly, FIG. 29C illustrates that a pull-out route 2950 is learned due to one other vehicle 2940 parked in front of the vehicle 100. On the other hand, since there are no obstacles including the other vehicle 2940 in front of the vehicle 100, the processor of the vehicle 100 controls pulling-out of the vehicle 100 by generating an easier or more favorable pull-out route 2960.

As described above, the present disclosure illustrated in FIGS. 29A to 29D achieves the technical effect that if a more favorable pull-out route than a learned pull-out route may be generated, an adaptively changed pull-out route is generated.

Figure 30:
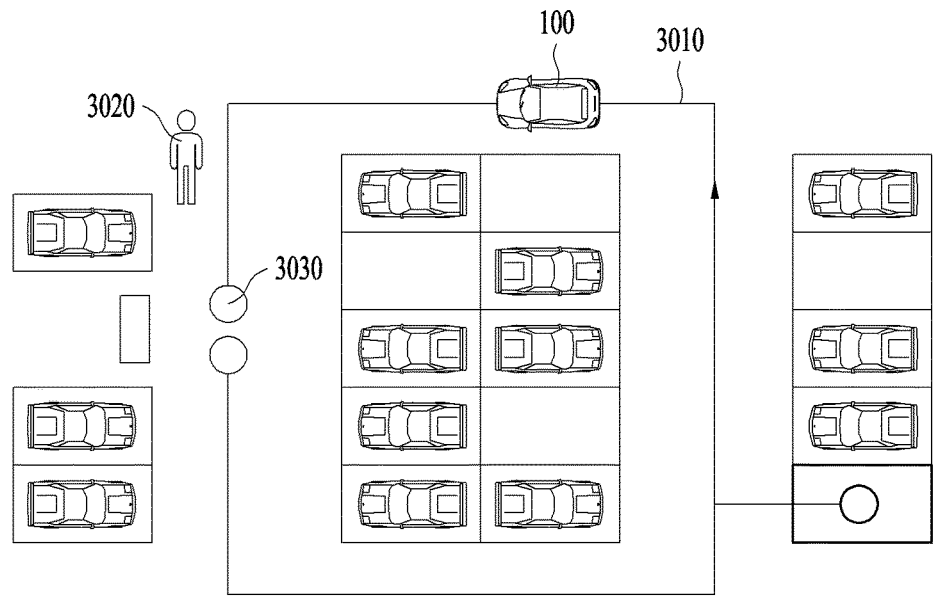
FIG. 30 is a view illustrating another example of a learning-based vehicle pulling-out method.
Figure 31:
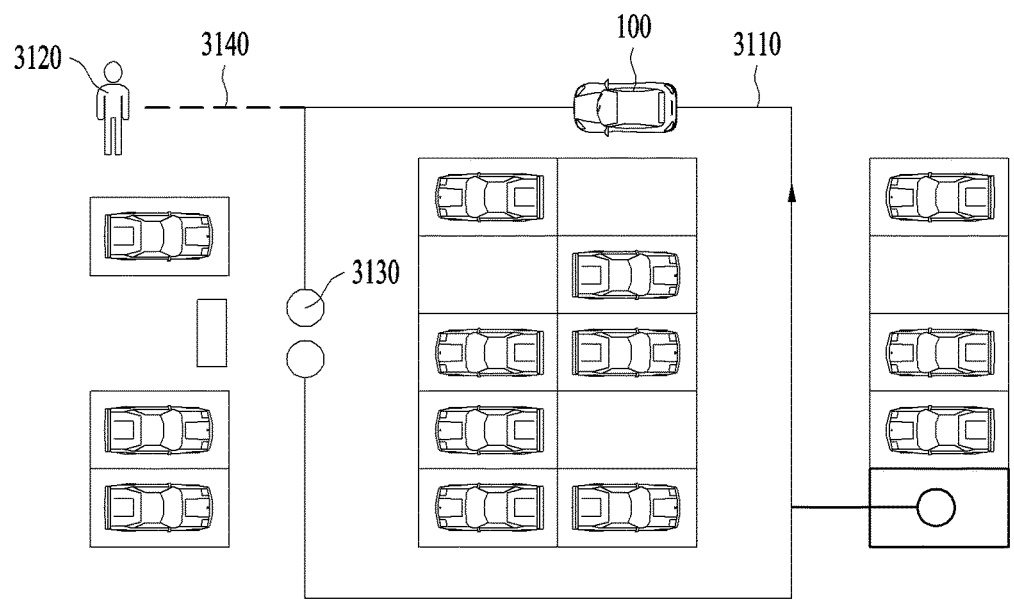
FIG. 31 is a view illustrating another example of a learning-based vehicle pulling-out method.

FIGS. 30 and 31 are views illustrating learning-based vehicle pulling-out methods according to other implementations of the present disclosure.

FIG. 30 illustrates that when the vehicle 100 identifies a user 3020 in the learned driving route 3010 by the camera 310 or the communication device 400 during driving in a learned driving route 3010, the vehicle 100 stops in front of the identified user 3020 without driving to an ending location 3030.

For user identification, a GPS module of the location information unit 420 or a method such as facial recognition or voice recognition may be used.

Unlike FIG. 30, FIG. 31 illustrates a case in which a user 3120 is located outside a learned driving route.

In this case, the vehicle 100 generates a new route 3140 to stop in front of the identified user 3120, without driving to an ending location 3130.

For example, the processor of the vehicle 100 first determines whether a new route 3140 can be generated by using a branch point or the like. When it is determined that the new route 3140 can be generated, the processor of the vehicle 100 may control the vehicle 100 to stop in front of the user using the generated new route 3140.

On the contrary, when it is determined that the new route 3140 cannot be generated, the processor of the vehicle 100 may designate a boarding location (e.g. a location closest to the user 3120) on the learned route to where the user will board, or may receive a boarding location from the user. the processor of the vehicle 100 may control the vehicle 100 to stop at the designated or the received boarding location.

As described above, since a vehicle does not drive to a learned ending location unconditionally, and upon identification of a user, stops in front of the user in the present disclosure illustrated in FIGS. 30 and 31, user convenience may be ensured.

As is apparent from the foregoing description, the implementations of the present disclosure have the following one or more effects.

First, an autonomous vehicle may actively learn at least one parking slot in a route learning step.

Secondly, while driving along a learned route, the autonomous vehicle may detect an empty parking slot, and even in the absence of the history of previous parking in the parking slot, the autonomous vehicle may be parked in the parking slot.

Thirdly, the vehicle may be pulled out of a parking slot in a route other than a route used for parking in a learned route.

The above-described present disclosure may be implemented as code that can be written on a computer-readable recording medium and thus read by a computer system. The computer-readable recording medium may be any type of recording device in which data is stored in a computer-readable manner. Examples of the computer-readable recording medium include a hard disk drive (HDD), a solid state disk (SSD), a silicon disk drive (SDD), a read only memory (ROM), a random access memory (RAM), a compact disk ROM (CD-ROM), a magnetic tape, a floppy disc, an optical data storage, and a carrier wave (e.g., data transmission over the Internet). The computer may include a processor or a controller. The above implementations are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A method of controlling a vehicle that is configured to be autonomously driven, the method comprising:
    determining a learned route based on a driving route that the vehicle has driven in a manual mode from a starting location to an ending location;
    driving the vehicle along the learned route in an autonomous mode;
    detecting a parking space based on driving the vehicle along the learned route in the autonomous mode; and
    based on a detection of the parking space in the learned route, parking the vehicle in the detected parking space,
    wherein determining the learned route based on the driving route comprises:
        detecting an object located in the driving route from the starting location to the ending location,
        determining a property of the object detected in the driving route, and
        storing information about the property of the object, and
    wherein storing the information about the property of the object comprises storing first information related to an object that is located at a static location in the driving route and second information related to an object that is movable in the driving route.

2. The method according to claim 1, wherein determining the learned route further comprises:
    based on the property of the object, determining a second route between a first location and a second location in the driving route, the second route being different from the driving route in which the vehicle has driven from the first location to the second location; and
    storing the second route as the learned route.

3. The method according to claim 1, wherein determining the learned route further comprises:
    determining a partial route including at least one of the starting location or the ending location; and
    based on the partial route, generating the learned route from the starting location to the ending location.

4. The method according to claim 1, wherein determining the learned route further comprises:
    detecting at least one branch point in the driving route in which the vehicle has driven; and
    storing a route that extends from the at least one branch point as the learned route.

5. The method according to claim 1, wherein driving the vehicle along the learned route in the autonomous mode comprises:
    determining, by an object detection device, that the vehicle has arrived at a location within a distance from the starting location;
    receiving, through a user interface device, a user input for starting to drive along the learned route; and
    based on the user input, driving the vehicle along the learned route from the location within the distance from the starting location.

6. The method according to claim 1, further comprising receiving information about a parking facility,
    wherein driving the vehicle along the learned route in the autonomous mode comprises:
        based on the information about the parking facility, modifying the learned route, and
        driving the vehicle along the modified learned route in the autonomous mode.

7. The method according to claim 1, wherein driving the vehicle along the learned route in the autonomous mode comprises:
    receiving a user input for returning the vehicle to one of the starting location or the ending location; and
    in response to the user input, controlling the vehicle to return to the one of the starting location or the ending location along the learned route.

8. The method according to claim 7, wherein controlling the vehicle to the one of the starting location or the ending location along the learned route further comprises:
    determining a current location of the vehicle in the learned route; and
    based on the determined current location of the vehicle, determining whether to maintain a driving direction of the vehicle.

9. The method according to claim 1, wherein detecting the parking space comprises:
    receiving, from an object detection unit, a detection result including detection of the object; and based on the received detection result and the stored information about the property of the object, detecting the parking space.

10. The method according to claim 9, wherein parking the vehicle in the detected parking space comprises:
based on a detection of a plurality of parking spaces, selecting a parking space according to a predetermined prioritization.

11. The method according to claim 1, wherein the parking space includes a reserved parking space that is located at the ending location.

12. The method according to claim 11, wherein parking the vehicle in the detected parking space comprises:
detecting an object in the reserved parking space, the object not being included in the learned route;
based on an area occupied by the object in the reserved parking space, determining an available area for parking of the vehicle; and
parking the vehicle in the available area.

13. The method according to claim 1, further comprising:
based on parking the vehicle in the detected parking space, storing information about a location of the detected parking space in a memory;
in response to a user input, obtaining the information about the location of the parking space and information about the learned route from the memory; and
controlling the vehicle to move out from the parking space to the ending location along at least a part of the learned route.

14. The method according to claim 13, further comprising:
detecting, by an object detection device, an object located outside of the vehicle; and
based on the detected object, generating a connection route to the learned route.

15. The method according to claim 13, wherein controlling the vehicle to move out from the parking space comprises:
determining a current location of the vehicle;
determining whether the current location of the vehicle has changed since the vehicle parked;
based on a determination that the current location of the vehicle has changed since the vehicle parked, determining whether the current location of the vehicle is in the learned route;
based on a determination that the current location of the vehicle is in the learned route, controlling the vehicle to move out from the parking space along the learned route; and
based on a determination that the current location of the vehicle is outside of the learned route, generating a connection route to the learned route and controlling the vehicle to move out from the parking space along the connection route to the learned route.

16. The method according to claim 13, further comprising:
identifying a user of the vehicle;
determining a location of the user;
based on the location of the user, determining whether the user is located in the learned route; and
based on a determination that the user is located in the learned route, controlling the vehicle to stop at the location of the identified user.

17. The method according to claim 16, further comprising:
based on a determination that the identified user is located outside of the learned route, generating a connection route to the location of the user; and
driving the vehicle to the location of the user along the connection route.

18. A vehicle comprising:
a wheel;
a power source configured to drive the wheel; and
at least one processor configured to:
determine a learned route based on a driving route that the vehicle has driven in a manual mode from a starting location to an ending location,
drive the vehicle along the learned route in an autonomous mode,
detect a parking space based on the vehicle being driven along the learned route in the autonomous mode,
based on a detection of the parking space in the learned route, park the vehicle in the detected parking space,
detect an object located in the driving route from the starting location to the ending location,
determine a property of the object detected in the driving route, and
store information about the property of the object,
wherein the information about the property of the object comprises first information related to an object that is located at a static location in the driving route and second information related to an object that is movable in the driving route.

* * * * *